(12) United States Patent
Geddes et al.

(10) Patent No.: US 12,007,226 B2
(45) Date of Patent: Jun. 11, 2024

(54) MEASUREMENT OF THICKNESS OF SCALE OR CORROSION

(71) Applicant: Schlumberger Technology Corporation, Sugar Land, TX (US)

(72) Inventors: Jill F. Geddes, Cambridge (GB); Trevor Lloyd Hughes, Cambridge (GB); Evgeny Borisovich Barmatov, Cambridge (GB); Man Yi Ho, Cambridge (GB); Paul Barnes, Aberdeen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 196 days.

(21) Appl. No.: 17/757,096

(22) PCT Filed: Dec. 8, 2020

(86) PCT No.: PCT/US2020/063730
§ 371 (c)(1),
(2) Date: Jun. 9, 2022

(87) PCT Pub. No.: WO2021/118966
PCT Pub. Date: Jun. 17, 2021

(65) Prior Publication Data
US 2023/0003517 A1 Jan. 5, 2023

Related U.S. Application Data

(60) Provisional application No. 62/947,845, filed on Dec. 13, 2019.

(51) Int. Cl.
*G01B 15/02* (2006.01)
*G01N 17/00* (2006.01)

(52) U.S. Cl.
CPC ........... *G01B 15/02* (2013.01); *G01N 17/006* (2013.01)

(58) Field of Classification Search
CPC .............................. G01B 15/02; G01N 17/006
See application file for complete search history.

(56) References Cited

U.S. PATENT DOCUMENTS

| | | |
|---|---|---|
| 3,056,284 A | 10/1962 | Marsh et al. |
| 4,495,558 A | 1/1985 | Cath et al. |

(Continued)

FOREIGN PATENT DOCUMENTS

| | | |
|---|---|---|
| EP | 2138832 A1 | 12/2009 |
| KR | 20120069367 A | 6/2012 |

(Continued)

OTHER PUBLICATIONS

East et al., "Analytical techniques to characterize scales and deposits", Mineral scales and deposits, pp. 681-699. (Year: 2015).*

(Continued)

*Primary Examiner* — Kiho Kim
(74) *Attorney, Agent, or Firm* — Jeffrey D. Frantz

(57) ABSTRACT

A method for measuring a thickness of a deposit layer on a metal or alloy substrate using an X-ray fluorescence (XRF) spectrometer, where the deposit layer includes scale deposits or corrosion products. As part of the method, an elemental composition of the deposit layer or the metal or alloy substrate is measured using the XRF spectrometer. The thickness of the deposit layer is obtained from the elemental composition using a calibration relationship between deposit layer thicknesses and corresponding elemental compositions of the deposit layer or the metal/alloy substrate. The method can be applied to determine the rate of deposit layer formation and evaluate the effectiveness of a treatment.

20 Claims, 12 Drawing Sheets

(56) References Cited

U.S. PATENT DOCUMENTS

| | | | |
|---|---|---|---|
| 4,577,338 | A | 3/1986 | Takahashi et al. |
| 4,669,310 | A | 6/1987 | Lester |
| 5,274,688 | A | 12/1993 | Grodzins |
| 6,631,177 | B1 | 10/2003 | Haszler et al. |
| 9,343,193 | B2 | 5/2016 | Chen et al. |
| 9,568,375 | B2 | 2/2017 | Bliss et al. |
| 9,581,934 | B2 | 2/2017 | Ito et al. |
| 2002/0012418 | A1* | 1/2002 | Sato ............... G01B 15/02 378/50 |
| 2010/0189215 | A1 | 7/2010 | Grodzins et al. |
| 2010/0272232 | A1 | 10/2010 | Pesce et al. |
| 2012/0257716 | A1 | 10/2012 | Grodzins |
| 2013/0079918 | A1 | 3/2013 | Spencer et al. |
| 2013/0202084 | A1 | 8/2013 | Piorek et al. |
| 2013/0322595 | A1 | 12/2013 | Connors |
| 2017/0001415 | A1 | 1/2017 | Hughes et al. |
| 2017/0219455 | A1 | 8/2017 | Mangali et al. |

FOREIGN PATENT DOCUMENTS

| | | |
|---|---|---|
| KR | 20170140855 A | 12/2017 |
| WO | 2015020530 A2 | 2/2015 |
| WO | 2015200112 A1 | 12/2015 |
| WO | 2017007499 A1 | 1/2017 |
| WO | 2021118773 A1 | 6/2021 |

OTHER PUBLICATIONS

Butt et al., "Identification of scale deposits through membrane autopsy", Desalination, vol. 101, pp. 219-230. (Year: 1995).*

International Search Report and Written Opinion in International Patent Application No. PCT/US2020/063730, dated Mar. 15, 2021, 8 pages.

International Preliminary Report on Patentability in International Patent Application No. PCT/US2020/063730, dated Jun. 23, 2022, 7 pages.

Al-Aithan, G. H. et al., "A Mechanistic Erosion-Corrosion Model for Predicting Iron Carbonate (FeCO3) Sale Thickness in a CO2 Environment with Sand", NACE Corrosion paper 3854, 2014, 15 pages.

ASTM B 487, "Test Method for Measurement of Metal and Oxide Coating Thickness by Microscopical Examination of Cross Section", ASTM, West Conshohocken, PA, 2013, 4 pages.

Chesney et al., "Nondestructive thickness gaging method for thin layers using x-ray fluorescence", 39th Materials Evaluation Conference, 1979, 13 pages.

Dill et al., "Coating thickness measurement of thin gold and palladium coatings on printed circuit boards using x-ray fluorescence", Circuit World, 2011, pp. 20-26, vol. 37, Issue 2.

Fiorini et al., "Determination of the thickness of coatings by means of a new XRF spectrometer", X-ray Spectrometry, 2002, pp. 92-99, vol. 31, Issue 1.

Hollis et al., "Spatial mapping of plasma sprayed coating thickness using x-ray fluorescence", Proceedings of the International Thermal Spray Conference, 2015, 7 pages.

Ida et al., "Analysis of painted steel by a hand-held x-ray fluorescence spectrometer", Spectrochimica Acta Part B, 2005, pp. 249-252, vol. 60, Issue 2.

Karimi et al., "Thickness measurement of coated Ni on brass plate using $K\alpha/K\beta$ ratio by XRF spectrometry", X-ray Spectrometry, 2009, pp. 234-238, vol. 38, Issue 3.

Lopes et al., "Thickness determination of gold layer on preColumbian objects and a gilding frame, combining XRF and PLS regression", X-ray Spectrometry, 2016, pp. 344-351, vol. 45, Issue 6.

Mazuritskiy et al., "SEM and XRF Spectroscopy Methods for Studying and Controlling the Surface Morphology of Metalpolymer Films", Journal of Surface Investigation. Xray, Synchrotron and Neutron Techniques, 2014, pp. 767-774, vol. 8, No. 4.

Meskauskas, A., "Determination of Thickness and Density of Ultra Thin Iron Films by Grazing Angle Incidence X-ray fluorescence", Materials Science, 2008, pp. 79-81, vol. 14, No. 1.

Prabhoo, B. et al., "Use of ellipsometry and gravimetry to develop calibration standards for measuring silicone coat weight and thickness with x-ray fluorescence spectroscopy", Surface and Interface Analysis, 2000, pp. 341-345, vol. 29, Issue 5.

Prasad M.S., et al., "Rapid on-site measurement of coating thickness of galvanized sheets by XRF technique at IISCo", Transactions of the Indian Institute of Metals, 1987, pp. 355-360, vol. 40, No. 4.

Thermo Scientific, "At Line Coating Thickness and Plating Bath Analysis Using Handheld XRF." Apr. 2015, 4 pages.

Langill, T.J., "Inspection of hot dip galvanized articles", Corrosion, paper No. 01428, 2001, 8 pages.

Barbosa, C.F., "A Simple Formula for Calculating the Coating Thickness of Galvanized Steel Wires", IEEE Transactions on Magnetics, 2014, 7 pages, vol. 50, Issue.

International Search Report and Written Opinion in International Patent Application No. PCT/US2020/060954, dated Apr. 2, 2021, 13 pages.

International Preliminary Report on Patentability in International Patent Application No. PCT/US2020/060954, dated Jun. 23, 2022, 9 pages.

Fess, S., "XRF as a method for measuring coat thickness of various conversion coatings on steel or aluminum," Steel Properties and Applications Conference, 2007, 14 pages.

\* cited by examiner

MEASUREMENT OF THICKNESS OF SCALE OR CORROSION

CROSS-REFERENCE TO RELATED APPLICATIONS

This application is a 371 National Stage Filing of International Patent Application No. PCT/US2020/063730, filed Dec. 8, 2020, and titled "Measurement of Thickness of Scale or Corrosion", which claims the benefit of, and priority to, U.S. Patent Application No. 62/947,845, filed Dec. 13, 2019, and titled "Measurement of Thickness of Scale or Corrosion". Each of the foregoing applications is expressly incorporated herein by this reference in its entirety.

BACKGROUND

As hydrocarbons and brines flow from a reservoir environment to a wellbore and the surface, changes in the prevailing pressure and temperature conditions may result in the precipitation and deposition of inorganic salts and scales through a process termed "self-scaling". In contrast, some scales may be formed by the co-mingling of incompatible fluids such as when barite ($BaSO_4$) is precipitated by mixing injected high sulfate seawater with formation brines that contain barium cations.

Some of the more common oilfield scales include calcite ($CaCO_3$), barite ($BaSO_4$), celestite ($SrSO_4$), anhydrite ($CaSO_4$), gypsum ($CaSO_4.2H_2O$), iron sulphide (FeS), and halite (NaCl). Less common oilfield scales include aragonite ($CaCO_3$), vaterite ($CaCO_3$), siderite ($FeCO_3$), fluorite ($CaF_2$), sphalerite (ZnS), galena (PbS), and various oxides, hydroxides and silicates.

Currently, the most common method used to determine scale thickness is a direct and destructive measurement that includes exposing, preparing, and examining test sample cross sections using optical or scanning electron microscopy (SEM). For example, Al-Aithan, G. H. et al., "A Mechanistic Erosion-Corrosion Model for Predicting Iron Carbonate ($FeCO_3$) Sale Thickness in a $CO_2$ Environment with Sand", NACE Corrosion paper 3854, 2014 describes the analysis of $FeCO_3$ scale formed on AISI 1018 carbon steel immersed in 2 wt % NaCl/1900 ppm $NaHCO_3$ at 65 and 93° C. and 241.3 KPa $CO_2$. The specimens, with scale formed, were mounted in epoxy, cross sectioned, polished, and the scale thicknesses was measured directly from SEM images. In addition to being a time consuming test, this direct method can be a challenge in term of sampling statistics.

Other methods that have been used to determine scale thickness include electrolytic reduction, ultrasonics, and temperature differential measurements. For instance, U.S. Pat. No. 4,495,558 describes an electrolytic reduction of an electrically insulative metal oxide deposited on an electrically conductive metal substrate. The electrolytic reduction requires the removal of the oxide, and the thickness of the oxide coating is determined by measuring the cell voltage change and elapsed time of reduction.

U.S. Pat. No. 4,669,310 describes the use of time-of-flight ultrasonic pulsing to detect and measure oxide scale on the inner cylindrical surface of a fluid containing boiler tube. This is achieved by positioning an ultrasonic transducer on the outer surface of the boiler tube, and the device then measures the buildup of scale on the inner surface. This ultrasonic method cannot be used to measure scale thickness from the scaled surface of the substrate.

U.S. Pat. No. 9,568,375 describes a temperature differential method to determine scale thickness in a liquid system, such as a heat exchanger. By comparing the temperature differential between two sensors on heated, wetted surfaces with and without scale, the thickness of scale on a scaled substrate can be determined based on the reduced heat transfer through the heated, wetted surface caused by the accumulated scale. In this method, sensors are positioned on and project through a conduit wall, flush with the inside of the conduit wall.

In addition to scaling, corrosion may occur within a well environment. For instance, significant corrosion may also occur on steel substrates (e.g., casing, drill pipe, coiled tubing) exposed to carbon dioxide ($CO_2$) rich aqueous systems. The dissolution of $CO_2$ in water results in the formation of carbonic acid ($H_2CO_3$) which partially dissociates to form bicarbonate ($HCO_3^-$) and carbonate ($CO_3^{2-}$) providing $H^+$ ions which drive the corrosion reaction. The oxidation of iron (Fe) from the steel surface produces $Fe^{2+}$, and when the concentrations of $Fe^{2+}$ and $CO_3^{2-}$ ions exceed the solubility limit, precipitation occurs on the steel surface to form a $FeCO_3$ film. The film acts as a diffusion barrier for corrosive species, reducing the corrosion rate of the steel. A dense and protective scale may form when the rate of precipitation is faster than the corrosion rate. In contrast, a porous, non-protective corrosion product layer may form when the corrosion rate is faster than the precipitation rate. Similarly, a high supersaturation of ions can result in a thin, well adhered surface film while at low ion supersaturation, fewer nucleation sites and slower crystal growth results in a less adherent, less protective film.

The protectiveness, rate of precipitation, and stability of the $FeCO_3$ film is influenced by the composition and microstructure of the base alloy, and characteristics of the corrosive environment such as temperature, $CO_2$ partial pressure, pH, and flow rate. For example, the precipitation of $FeCO_3$ is facilitated and the rate of scaling is increased by increasing the pH and temperature and by reducing the rate of transport of reactant and corrosion products to and from the steel surface. The scale that forms at higher temperature (e.g., at or above 60° C.) can be more adherent and protective than that formed at a lower temperature. When conditions are favorable for the formation of $FeCO_3$ scale, increasing the partial pressure of $CO_2$ can also result in accelerated precipitation of $FeCO_3$. Corrosion products may be various oxides, hydroxides, etc., and mixtures with the more corrosion resistant phases in the metal or alloy (e.g., enrichment of the surface with metal carbides such as iron carbide ($Fe_3C$).

Pitting corrosion can occur when the $FeCO_3$ film is not continuous due to being formed under conditions that favor porous films with low adherence to the surface such as low temperature, low pH, and low ion supersaturation. A film with low adherence can cause a separation between the metal and the scale, allowing the solution to penetrate and contact a large metal area below the scale. This contact enables "under-scale" corrosion to continue even though scale coverage of the metal appears to be complete. Similarly, any mechanical damage to the protective $FeCO_3$ film that exposes the underlying metal to an aggressive corrosive environment will likely lead to localized corrosion. The presence of Calcium (Ca) can also lead to localized corrosion since $Ca^{2+}$ can incorporate into the $FeCO_3$ structure and, at sufficient $Ca^{2+}$ concentrations, the mixed metal carbonate may not be protective.

Iron sulphide (FeS) scale can be formed due to hydrogen sulphide ($H_2S$) corrosion of carbon steel, or the reaction of sulphide with free ferrous ions. The low solubility and fast precipitation kinetics of FeS lead to accumulation of the scale on steel, accelerating pitting and crevice corrosion. The precipitation of FeS is enhanced by a lower flow rate, a higher temperature, and a higher ionic strength. Higher temperatures (e.g., at or above 70° C.), can significantly promote $H_2S$ corrosion, FeS deposition, and FeS scale retention.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth. The scope of this disclosure is defined by the accompanying claims.

The present disclosure describes embodiments that include a non-destructive method for quantifying a thickness of scale deposits, corrosion products, or both and changes in scale/corrosion thickness with time on a metal or alloy substrate using XRF measurements. This method allows the scaled and/or corroded substrate to remain intact. In some embodiments, ratios of analyses of elements associated with the deposit layer and the underlying substrate measured by an XRF spectrometer are used to quantify a thickness of the deposit layer and changes in deposit layer thickness over time. The XRF measurements can be calibrated with respect to direct deposit layer thickness measurements taken from cross-sections.

Some example methods are used to decide when to perform or trigger automatic performance of a treatment, repair, or other remediation of a tool or equipment, or when to replace the tool or equipment. A treatment may include scale removal, scale dissolution, scale erosion, acid pickling, scale blasting, other remediation processes, or combinations of the foregoing.

Some methods of the present disclosure may be used to determine rate of scale/corrosion formation by comparing elemental compositions or deposit layer thicknesses before and after exposure to a corrosive/scaling environment. The rate of deposit layer formation can then be used to evaluate the one or more of the strength of the corrosive/scaling environment or the effectiveness of a treatment designed to reduce corrosion/scaling.

In addition, some methods of the present disclosure can be applied to observe the overall trend of corrosion/scaling rate or to predict a future trend of corrosion/scaling rate.

BRIEF DESCRIPTION OF THE DRAWINGS

The present disclosure is described in conjunction with the appended Figures.

FIG. 13-1 shows an increase in the surface concentration of Cu relative to iron concentration detected by XRF following exposure to brine;

FIG. 13-2 shows an increase in the surface concentration of Cr relative to iron concentration detected by XRF following exposure to brine;

FIG. 13-3 shows an increase in the surface concentration of Ni relative to iron concentration detected by XRF following exposure to brine;

FIG. 13-4 shows an increase in the surface concentration of Mn relative to iron concentration detected by XRF following exposure to brine;

FIG. 13-5 shows an increase in the surface concentration of Mo respectively relative to iron concentration detected by XRF following exposure to brine;

FIG. 14-1 shows a calibration relationship between changes in the concentration of Cu in a steel substrate detected by XRF and corresponding cumulative corrosion rates of the substrate in brine with a corrosion inhibitor;

FIG. 14-2 shows a calibration relationship between the changes in the concentration of Cr in a steel substrate detected by XRF and corresponding cumulative corrosion rates of the substrate in brine and with a corrosion inhibitor;

FIG. 14-3 shows a calibration relationship between the changes in the concentration of Ni in the carbon steel substrate detected by XRF and corresponding cumulative corrosion rates of the substrate in brine and with a corrosion inhibitor;

FIG. 15-1 shows an increase in the surface concentration of Cu over time following exposure to brine and a corrosion inhibitor;

FIG. 15-2 shows an increase in the surface concentration of Cr over time following exposure to brine and a corrosion inhibitor;

FIG. 15-3 shows an increase in the surface concentration of Mn over time following exposure to brine and a corrosion inhibitor.

Figure 1:
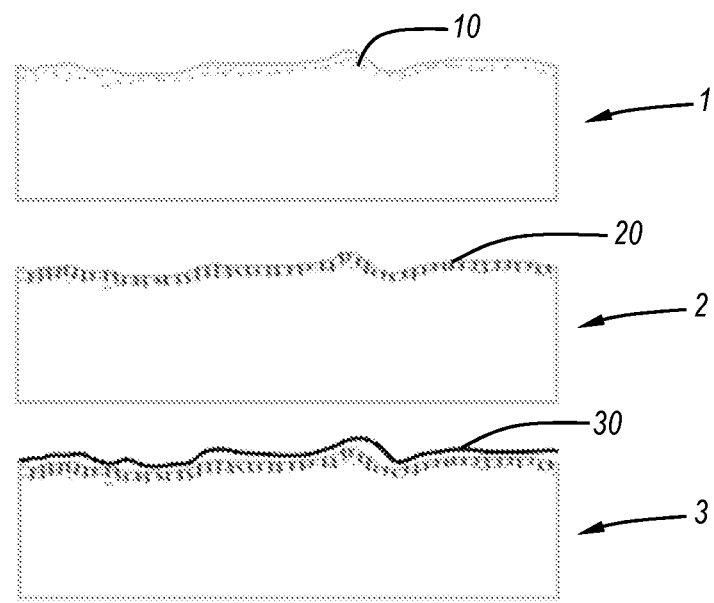
FIG. 1 schematically illustrates stages of scale development on a carbon steel substrate, according to an embodiment of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides a description of some example embodiments, and is not intended to limit the scope, applicability, or configuration of the claims. Rather, this description is to explain some example embodiments consistent with aspects of the present disclosure and to provide those skilled in the art with an enabling description for making and using illustrative embodiments. Various changes may be made in the function and arrangement of elements without departing from the scope of the description and appended claims.

Embodiments of the present disclosure relate broadly to methods, devices, and systems to monitor the nature, extent, formation and growth of scale deposits and corrosion products on metal/alloy substrates. Furthermore, the method can be used to monitor the reduction of scale deposits and corrosion products on the metal/alloy substrates after a treatment such as a scale and corrosion product remedial (e.g., removal, treatment, or cleaning) procedure/treatment. Specifically, some embodiments of the present disclosure relate to use of X-ray Fluorescence (XRF) spectroscopy to measure a thickness of a deposit layer on a metal or alloy substrate. Such deposit layer can include scale deposits or corrosion products, and XRF spectroscopy may be used to determine the rate of deposit layer formation over time, or to evaluate the effectiveness of the treatment. Evaluating the deposit layer may include a calibration relationship used to quantify scale or corrosion layer thickness using a measured elemental composition of the surface and changes in the thickness with time via measured changes in the elemental composition of the surface.

XRF measurements of the present disclosure may be taken directly on the scaled and/or corroded surface, and may give a result instantaneously or in near real-time (e.g., less than 30 seconds, less than 5 seconds, less than 2 seconds, or even less than 1 second). Therefore, measurements can be conveniently taken on site using a portable device, such as an analyzing downhole tool on a rig site.

Another feature of using XRF measurements according to the present disclosure to determine deposit layer thickness is that, unlike direct methods such as SEM, XRF measurements can be non-destructive as no cutting or cross-sectioning is used to assess the nature of the scale/corrosion. As a result, the sample, tool, or piece of equipment to be analyzed can stay intact and may even be returned into service to perform its function when the analysis indicates an acceptable (e.g., acceptably low) level of scale/corrosion.

XRF analysis can be limited by the maximum depth of analysis of the corresponding XRF device; however, the inventors of the present disclosure have found that, despite this limitation, XRF spectroscopy works well for the purpose of the present disclosure and can be used to accurately and conveniently determine the thickness of a deposit layer, particularly in combination with a calibration relationship between deposit layer thickness and the elemental composition of the deposit layer and/or the substrate.

In one aspect, the present disclosure provides a method for measuring a thickness of a deposit layer on a metal or alloy substrate using an X-ray fluorescence (XRF) spectrometer, wherein the deposit layer includes scale deposits, corrosion products, or both scale deposits and corrosion products. The method can include measuring an elemental composition of any one or more of the deposit layer, the metal substrate, or the alloy substrate using the XRF spectrometer and obtaining the thickness of the deposit layer from the elemental composition. Obtaining the thickness may include using a calibration relationship between deposit layer thicknesses and corresponding elemental compositions of the corresponding deposit layer, metal substrate, or alloy substrate.

The elemental composition may be a concentration of an element in the deposit layer and/or the metal or alloy substrate, and the calibration relationship may be a relationship between deposit layer thicknesses and corresponding concentrations of the element in the deposit layer and/or the metal or alloy substrate.

In some embodiments, the elemental composition may be a ratio between a concentration of an element in the deposit layer and a concentration of an element in the metal or alloy substrate, and the calibration relationship may be a relationship between deposit layer thicknesses and corresponding ratios between the concentration of the element in the deposit layer and the concentration of the element in the metal or alloy substrate. Optionally, the ratio may be between a concentration of an element enhanced in the deposit layer and a concentration of an element enhanced in substrate and obscured by deposit layer.

When establishing the calibration relationship, the deposit layer thicknesses may be measured using a direct measurement method such as SEM, and the corresponding elemental compositions of the deposit layer and/or the substrate may be measured by an XRF spectrometer. The XRF measurements on substrates with different deposit layer thicknesses may then be correlated with the corresponding deposit layer thicknesses as determined by SEM to produce the calibration relationship.

For example, identical test coupons made of the relevant substrate material may be produced and then exposed to a corrosive/scaling environment for varying length of time to produce test coupons with different deposit layer thicknesses. For each test coupon, an elemental composition can be determined by XRF and a corresponding deposit layer thickness can be determined by SEM. The elemental compositions and the corresponding deposit layer thicknesses of the test coupons can be used to generate a calibration relationship.

Once established, the calibration relationship can be used to determine deposit layer thicknesses using XRF measurements alone, thereby potentially eliminating the use of direct measurements such as SEM in field measurements. As noted herein, SEM is a destructive test and cuts the tool to expose a cross-section, which is polished for accurate measurements of deposit layer thickness.

When an XRF spectrometer is used, the thickness of the deposit layer obtained using the calibration relationship may be an average thickness of the deposit layer. The XRF spectrometer may be a wavelength-dispersive spectrometer or an energy-dispersive XRF (EDX) spectrometer. When either is used without SEM, the thickness of the deposit layer obtained using the calibration relationship may be an average thickness of the deposit layer. When SEM-EDX is used, the thickness of the deposit layer obtained using the calibration relationship may be a localized thickness of the deposit layer, because when SEM and EDX are used together, chemical composition of a localized area in a sample may be analyzed.

Accordingly, the analyzed scale deposit or layer of corrosion products may be reported as a concentration of scale per unit area when an average compositional analysis is made using XRF. The analyzed scale deposit or layer of corrosion products may be reported as a scaled or corrosion product thickness of the scaled or corroded regions, when compositional analysis of scaled or corroded regions is made using SEM-EDX.

The deposit layer may include inorganic scale deposits and/or corrosion products. By way of illustration, inorganic scale deposits may include at least one of calcite ($CaCO_3$), barite ($BaSO_4$), celestite ($SrSO_4$), anhydrite ($CaSO_4$), gypsum ($CaSO_4.2H_2O$), iron sulphide (FeS), halite (NaCl), aragonite ($CaCO_3$), vaterite ($CaCO_3$), siderite ($FeCO_3$) fluorite ($CaF_2$), sphalerite (ZnS), galena (PbS), or silicate scales. The inorganic corrosion products may include at least one of oxides, hydroxides, or carbides.

In the same or other embodiments, the deposit layer may include organic deposits. The method may be used to analyze organic deposits where the elements associated with the metal/alloy substrate are increasingly obscured as the organic scale forms and builds up on the surface. In addition, the organic scale may contain XRF-detectable elements such as nickel (Ni) and vanadium (V) in asphaltenic deposits or Ca in calcium naphthenate deposits.

Metal or alloy substrates used in accordance with some embodiments of the present disclosure may be part of a tool or equipment used in a corrosive or scaling environment. This may include tools inserted into a downhole environment to perform various oilfield operations, treatments, or measurements. For example, the substrate may be an armored housing of power cables for downhole use made of a copper nickel alloy, or may be casing, coiled tubing, drill collars, drill pipe, or the like.

In some embodiments, the metal or alloy substrate may be test samples used to evaluate the strength of a corrosive/scaling environment and/or the performance of scale/corrosion inhibitors or other production chemicals. Such test samples may be exposed to the scaling and/or corrosive fluid environment in the laboratory or under wellbore/downhole conditions.

When the metal or alloy substrate is part of a tool or equipment used in a corrosive and/or scaling environment, the method may be used to obtain information used to decide when to deploy, repair (including remediation), or replace the tool or equipment. As such, the method may further include, for example, comparing the thickness of the deposit layer with a predetermined threshold and deciding whether to repair or replace the tool or equipment. In the same or other embodiments, the method may include comparing the thickness of the deposit layer with a predetermined static or dynamic threshold and triggering automatic deployment, repair, or replacement of the tool or equipment.

Furthermore, monitoring of the scaling and corrosion of metal tools and/or equipment used in a corrosive/scaling environment can be used to inform operations regarding the timing of servicing. For example, it may be decided that a treatment should be performed when the thickness of the deposit layer reaches a predetermined threshold. The treatment may be triggered, or an alert may be generated, automatically when the predetermined threshold is reached. For instance, upon calculating (e.g., downhole or at the surface), that a deposit has exceeded the predetermined threshold (e.g., 3 micron, 6 micron, 12 micron, 15 micron, 20 micron, 50 micron, etc.), a sensor or computing system may initiate or request a treatment. The predetermined threshold may be a fixed thickness or may be adaptive/dynamic. For instance, the predetermined threshold may vary based on different conditions, such as the type of operation being performed, the size of the tool, the materials being used, and the like. A treatment that is performed may include any methods suitable for reducing corrosion and/or scaling such as adding scale inhibitors and/or corrosion inhibitors, a cleaning procedure, a mechanical removal procedure to remove scale deposits and/or corrosion products, or the like.

The methods described herein may be used to measure a rate of deposit layer formation on a metal or alloy substrate using an XRF spectrometer, where the deposit layer includes scale deposits or corrosion products. This may include obtaining a first thickness of the deposit layer and exposing the metal or alloy substrate to a scaling and/or corrosive environment for a first period. This may be repeated to obtain a second thickness of the deposit layer after the first period, and the first thickness and the second thickness can be compared and used in determining the rate of deposit layer formation on the metal or alloy substrate.

The rate of deposit layer formation may be calculated by dividing the difference between the first thickness and the second thickness by the length of the first period, although the first period may be any unit of time. Linear or non-linear models may be applied to calculate an instantaneous rate of deposit layer formation.

The rate of deposit layer formation may be expressed in terms of rate of corrosion and/or rate of scaling. Furthermore, the rate of corrosion and/or rate of scaling may be cumulative rate of corrosion and/or cumulative rate of scaling.

The first thickness of the deposit layer may be obtained using the methods described herein (e.g., obtained from an elemental composition measurement using a calibration relationship). In other embodiments, to determine the rate of deposit layer formation on a clean metal or alloy substrate without any scale/corrosion, the first thickness of the deposit layer may be zero.

Another aspect of the present disclosure includes a method for measuring a rate of deposit layer formation on a metal or alloy substrate using an XRF spectrometer, where the deposit layer includes scale deposits and/or corrosion products, and the method includes obtaining a first elemental composition of the deposit layer and/or the metal or alloy substrate, exposing the metal or alloy substrate to a scaling and/or corrosive environment for a first period, measuring a second elemental composition of the deposit layer and/or metal or alloy substrate using the XRF spectrometer after the first period, obtaining a first change in elemental composition by calculating the difference between the first and second elemental composition of the deposit layer and/or the metal or alloy substrate, and determining a first rate of deposit layer formation on the metal or alloy substrate using a calibration relationship between rates of deposit layer formation and corresponding changes in elemental composition. The rate of deposit layer formation may be expressed as a rate of corrosion and/or a rate of scaling.

The calibration relationship may be a calibration relationship between rate of deposit layer formation measured using an electrochemical method and corresponding changes in elemental composition measured using an XRF spectrometer. The electrochemical method may include linear polarization resistance. The elemental composition may be a concentration of an element in the deposit layer and/or the metal or alloy substrate or a ratio between a concentration of an element in the deposit layer and a concentration of an element in the metal or alloy substrate.

The first change in elemental composition can be the change in elemental composition over the first period. The corresponding changes in elemental composition used when establishing the calibration relationship may be measured over the same length of time as the first period for ease of comparison. The first period may for example be one minute, five minutes, ten minutes, half an hour, an hour, two hours, five hours, ten hours, twenty-four hours, or anything therebetween. In other embodiments, the period may be less than one minute or greater than twenty-four hours. In further embodiments, the corresponding changes in elemental composition per unit time may be used when establishing the calibration relationship. A corresponding change in elemental composition per unit time may be obtained by dividing the change in element composition by the length of time over which the changes occurred. Similarly, the first change in elemental composition per unit time may be calculated by dividing the first change by the first period. The first change in elemental composition per unit time may then be used to determine a first rate of deposit layer formation using a calibration relationship between rates of deposit layer formation and corresponding change in elemental composition per unit time.

The first elemental composition of the deposit layer and/or the metal or alloy substrate may be obtained using an XRF spectrometer. Optionally, to determine the rate of deposit layer formation on a clean metal or alloy substrate without any scale/corrosion, the first elemental composition of the deposit layer and/or the metal or alloy substrate may be obtained from the manufacturer of the substrate or re-surfaced by a supplier or the entity performing the method.

The rate of deposit layer formation may be used to evaluate the strength of a scaling and/or corrosive environment on a certain type of metal/alloy substrate. For example, an environment which produces a higher rate of deposit layer formation over the same period of time under the same conditions has a stronger scaling and/or corrosive effect on the metal/alloy substrate.

Moreover, example methods may also include exposing the metal or alloy substrate to the scaling and/or corrosive environment for a second period, measuring a third elemental composition of the deposit layer and/or the metal or alloy substrate using the XRF spectrometer after the second period, obtaining a second change in elemental composition by calculating the difference between the second and third elemental composition of the deposit layer and/or the metal or alloy substrate, determining a second rate of deposit layer formation on the metal or alloy substrate during the second period using a calibration relationship between rates of deposit layer formation and corresponding changes in elemental composition, and determining overall rate of deposit layer formation on a metal or alloy substrate.

For ease of comparison and/or calculation, the first period may be the same as the second period, although this is merely illustrative and the first and second periods may be different. The second rate of deposit layer formation may be obtained by using the second change in elemental composition per unit time and, in establishing the calibration relationship, corresponding changes in elemental composition per unit time, or simply by selecting the second period and optionally also the first period to be unit time. Generally, a change in elemental composition per unit time may be calculated by dividing the change in elemental composition by the length of the period.

In addition, the methods described herein may include exposing the metal or alloy substrate to the scaling and/or corrosive environment for a second period, measuring a third elemental composition of the deposit layer and/or the metal or alloy substrate using the XRF spectrometer after the second period, obtaining a second change in elemental composition by calculating the difference between the second and third elemental composition of the deposit layer and/or the metal or alloy substrate, determining a second rate of deposit layer formation on the metal or alloy substrate during the second period using a calibration relationship between rates of deposit layer formation and corresponding changes in elemental composition, and predicting a future rate of scaling and/or future rate of corrosion.

Again, for ease of comparison and/or calculation, the first period may be the same as the second period or may be different. The second rate of deposit layer formation may be obtained by using the second change in elemental composition per unit time and, in establishing the calibration relationship, corresponding changes in elemental composition per unit time, or simply by selecting the second period and optionally also the first period to be unit time. Generally, a change in elemental composition per unit time may be calculated by dividing the change in elemental composition by the length of the period.

In embodiments of the present disclosure the scaling and/or corrosive environment may be a downhole environment. For instance, the environment may be encountered in a well exploration, well construction, fluid production, or wellbore treatment operation.

Monitoring the scaling deposits and corrosion products remaining on tools and/or equipment after servicing/remediation allows the effectiveness of the treatment to be evaluated. Specifically, the some embodiments of the present disclosure provide methods for evaluating the effectiveness of a treatment to reduce scale deposits and/or corrosion products on a metal or alloy substrate using XRF spectrometry, where the metal or alloy substrate is exposed to a scaling and/or corrosive environment. Example methods include obtaining a first rate of corrosion and/or scaling, performing the treatment to reduce scale deposits and/or corrosion products on the metal or alloy substrate, obtaining a second rate of corrosion and/or scaling, comparing the first rate of corrosion and scaling with the second rate of corrosion and scaling, and evaluating the effectiveness of the treatment to reduce scale deposits and/or corrosion products.

An example treatment that is evaluated may include any treatment suitable for, or intended to, reduce scaling and/or corrosion, and may include adding scale inhibitors and/or corrosion inhibitors to the scaling and/or corrosive environment, a cleaning procedure, or a removal procedure. The removal procedure may be deployment of scale and corrosion product removal/treatment/cleaning strategies using chemical, chemo-mechanical, mechanical, electrical, electrochemical, or electromechanical methods. For instance, a removal procedure may include scale removal, scale dissolution, scale erosion, acid pickling, or scale blasting treatments.

Monitoring of the scaling and corrosion can be used to optimize and/or design the chemistry and performance of scale inhibitors, corrosion inhibitors and/or combined scale and corrosion inhibitors by evaluating relative effectiveness of different inhibitors or combinations of inhibitors. Similarly, the effectiveness of cleaning or removal procedures can also be evaluated by monitoring the scaling deposits and corrosion products remaining on the test samples after removal/cleaning procedures.

Example 1

Growth of $FeCO_3$ Scale on Carbon Steel Substrate Exposed to $CO_2$-Saturated Brine at 150° C.

In XRF spectroscopy, a specimen is excited by a high-energy beam of x-rays. This process causes electrons from the inner electron shells to be ejected. Electrons from outer electron shells then fill the voids, and in this process, energy is released in the form of x-rays. The number and energy of the x-rays emitted from the sample can be measured by an energy-dispersive spectrometer or a wavelength-dispersive spectrometer. Since the x-rays emitted are characteristic of the difference in energy between two shells in an atomic structure, the elemental composition of a sample can be measured.

In a first example, a low carbon AISI SAE 1018 steel with a manufacturer's composition specification of 0.14-0.20% carbon, 98.81-99.26% iron, 0.60-0.90% manganese, 0.040% phosphorous, and ≤0.050% sulfur, was the substrate material, and all percentages are weight percentage. Test coupons made of the low carbon 1018 steel were treated by glass bead blasting (GBB) and then exposed to $CO_2$-saturated brine at 150° C. After different lengths of time, various elemental compositions of the deposit layer or the substrate were determined by measuring coupon surfaces using XRF and SEM-EDX respectively, while corresponding deposit layer thickness was directly measured using a scanning electron microscope (SEM).

Finally, elemental compositions of the deposit layer and/or the substrate were correlated with corresponding deposit layer thicknesses to produce a calibration relationship, so that future unknown deposit layer thickness can be determined using non-destructive XRF or SEM-EDX methods.

Prior to GBB and exposure to $CO_2$-saturated brine, XRF analysis of the bulk C-steel substrate gave the following elemental composition (wt %), bearing in mind that carbon was not detected by XRF measurements.

TABLE 1

| Fe | Mn | Cu | Cr | Bi | Mo | Ti | Si |
|---|---|---|---|---|---|---|---|
| 98.302% | 0.832% | — | 0.007% | 0.002% | — | — | — |

Glass bead blasting (GBB) is a type of abrasive blasting, and is the operation of forcibly propelling a stream of fine glass beads against a surface under high pressure to smooth a rough surface, roughen a smooth surface, shape a surface, or remove surface contaminants. GBB is a method that may be used to homogenize the surface of metal test samples used in laboratory corrosion testing. GBB creates a non-directional textured surface which reduces effects of cutting scratches, sharp edges, and surface inhomogeneity on the test results. Following a GBB treatment, some of the glass impacting material remains embedded in the surface and, as a result, silicon may be detected by XRF measurements.

The surface composition of the bulk C-steel substrate following a glass bead blasting treatment and before exposure to $CO_2$-saturated brine was as follows:

TABLE 2

| Fe | Mn | Cu | Cr | Bi | Mo | Ti | Si |
|---|---|---|---|---|---|---|---|
| 97.383% | 0.805% | 0.009% | 0.010% | 0.003% | 0.003% | 0.003% | 0.960% |

A series of glass bead blasted 1018 steel test coupons was exposed to 3 wt % NaCl solutions saturated with $CO_2$ at 150° C. for different lengths of times ranging from 2 to 48 hours under static conditions in a high temperature testing cell. After the exposure, the coupons were rinsed with water and dried. Scale deposition was clearly evident on the test coupons.

FIG. 1 is a schematic view of a carbon steel substrate and illustrates stages of $FeCO_3$ scale development on the carbon steel substrate in this Example 1. At 1, GBB is performed and an initial glass bead blasted steel surface includes silicon 10 embedded in the surface.

At 2, carbide enhancement occurs and the surface becomes enhanced in iron carbide ($Fe_3C$) 20 after corrosion. After further corrosion under brine/$CO_2$ conditions, a $FeCO_3$ scale 30 develops at 3, which obscures detection by XRF or EDX analysis of the underlying silicon associated with the glass bead blasted steel surface.

Three XRF measurements were collected at different positions on both sides of each coupon and an average composition was calculated. The measured concentration of silicon (associated with the GBB treatment) had decreased from around 0.96 wt % before exposure to 0 wt % after growth of a 24 micron thick $FeCO_3$ scale. Thus, the growth of the $FeCO_3$ scale obscured the Si associated with the glass bead blasted substrate surface. Correspondingly, the measured concentration of iron increased from around 97.4 to 98.2 wt %. It should be noted here that the carbon and oxygen present in the scale layer were not detected by XRF measurements, so the signature of a scale layer has a higher iron content than the non-scaled metal substrate.

Figure 2:
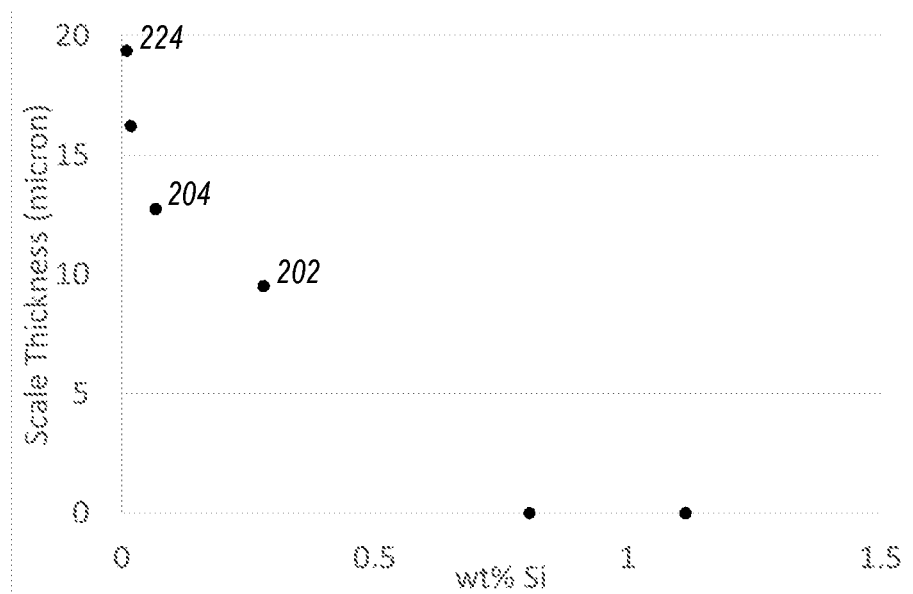
FIG. 2 shows a calibration relationship between deposit layer thicknesses measured by SEM and corresponding concentrations of silicon in the carbon steel substrate measured by XRF.

FIG. 2 shows the calibration relationship between scale thicknesses measured by SEM and corresponding weight percentages of silicon measured by XRF analysis. Scale coverage was found to be complete after exposure for 24 hours (point 224 of FIG. 2). After 2 hours of exposure (point 202), the XRF silicon content was reduced from 0.96 to 0.28 wt %, corresponding to a scale thickness (where present) of 9.5 microns. It should be noted here that without knowledge of scale coverage, it would be difficult and potentially impossible to distinguish a very thin scale with complete coverage from a thicker scale with incomplete coverage. After 24 hours exposure (point 224), the silicon concentration measured was 0.009 wt %, corresponding to complete scale coverage and a scale thickness of 19.4 microns. As shown in FIG. 2, after 4 hours exposure (point 204), the scale thickness was about 12.5 micron and the XRF content was reduced to 0.07 wt %.

For calibration purposes, a direct determination of the scale thickness on each of the test coupons was performed. For each coupon, a representative edge was polished with P240, followed by P600, then P1200 silicon carbide paper. Additional polishing was achieved with 9 micron and then 3 micron diamond paste. The scale thickness was measured directly by examining the coupon cross-section in a scanning electron microscope (SEM) and collecting multiple measurements of scale thickness along the cross-section. For coupons where the scale coverage was not complete, the scale thickness noted is the thickness where scale was present.

The elemental compositions determined by non-destructive XRF measurements on the scaled surfaces of test coupons were then correlated with the scale thicknesses measured directly on cross-sections using SEM to produce a calibration relationship.

Figure 3:
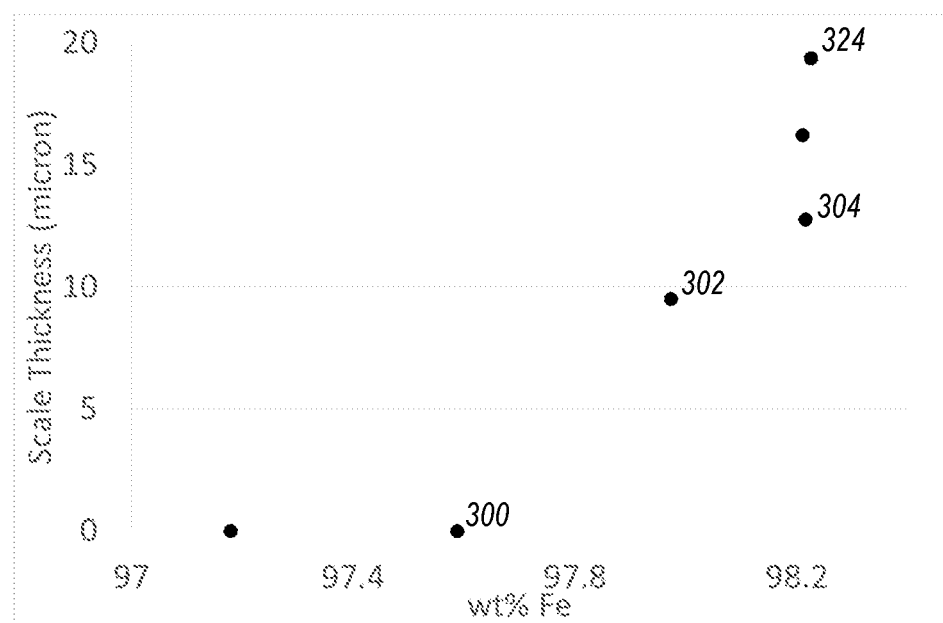
FIG. 3 shows a calibration relationship between deposit layer thicknesses measured by SEM and corresponding concentrations of iron in the deposit layer measured by XRF.

FIG. 3 shows the calibration relationship between scale thicknesses measured by SEM and corresponding weight percentages of iron measured by XRF analysis after various exposure times. Point 300 represents the original sample, point 302 represents the sample after 2 hours of exposure, and points 304 and 324 represents the samples after 4 hours and 24 hours, respectively. The decrease of silicon with increasing $FeCO_3$ scale thickness is due to obscuration of silicon in the steel substrate surface by the overlying scale. The normalized analysis (excluding carbon and oxygen) and presence of iron in both the substrate and the scale result in the weight percentage of iron increasing with increasing scale thickness.

Alternatively, the calibration relationship may be a relationship between deposit layer thicknesses and corresponding ratios between the concentration of an element in the deposit layer and the concentration of an element in the metal or alloy substrate. Optionally, the ratio is between a concentration of an element enhanced in the deposit layer over a concentration of an element enhanced in the substrate and obscured by the deposit. Generally, such XRF-determined ratio may be given by:

$$\text{XRF ratio} = X_{dc}/Y_{dc},$$

where $X_{dc}$ is the concentration of an element X enhanced in the deposit layer, and $Y_{dc}$ is the concentration of an element Y enhanced in the substrate and obscured by the deposit layer.

Figure 4:
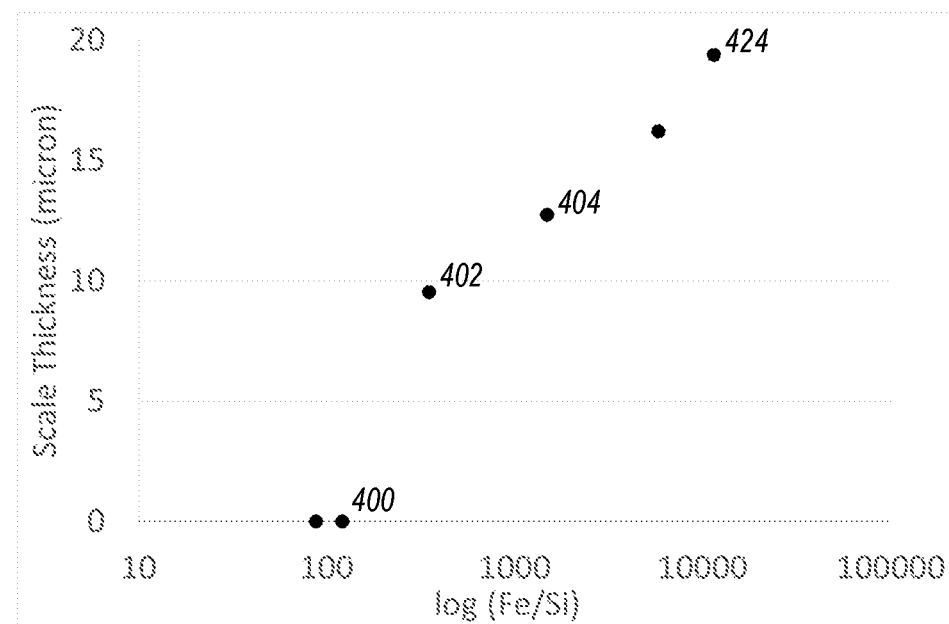
FIG. 4 shows an example of a calibration relationship between deposit layer thicknesses measured by SEM and corresponding ratios between the concentration of iron in the deposit layer and the concentration of silicon in the substrate measured by XRF.

For example, a suitable XRF-determined ratio may be log wt (Fe/Si), where Fe is element X that is enhanced in the deposit layer and Si is element Y that is enhanced in the substrate and obscured by the deposit layer. FIG. 4 shows an example of this alternative calibration relationship in which the scale thickness measured by SEM is directly proportional to log (Fe/Si) measured by XRF, with point 400 representing the original sample, and points 402, 404, and 424 representing samples after 2, 4, and 24 hours, respectively.

The XRF ratio captures two effects simultaneously, namely the increase in element X in the deposit layer and the decrease in element Y in the metal/alloy substrate due to obscuration by the deposit layer that's built up. Compared with using only the increase in X in the deposit layer or the decrease in Y in the substrate, using the ratio takes into account both effects simultaneously and can thus be more sensitive to changes in deposit layer thickness in this example.

Furthermore, by using log (X/Y) against exposure time, a linear calibration relationship is established which allows for a potentially clearer and more accurate interpretation of raw data, compared with looking at two separate calibration relationships based on increase in X and decrease in Y respectively.

Since XRF gives an average composition of the surface (i.e., the average of scaled and non-scaled regions), it is possible to express the scale thickness as an average $FeCO_3$ concentration per unit area.

The analysis was repeated using SEM-EDX, where scale coverage was measured by compositional mapping of the coupon surfaces by SEM-EDX. SEM produces a magnified image of the sample, which then allows EDX to carry out a localized chemical composition analysis. As a complementary or alternative technique to XRF spectroscopy, SEM-EDX can give a localized compositional analysis of the scaled and non-scaled regions separately. Thus, with SEM-EDX, a direct measurement of scale thickness can be correlated to, for example, the composition of $FeCO_3$ in regions where scale is present to produce a localized calibration relationship.

Figure 5:
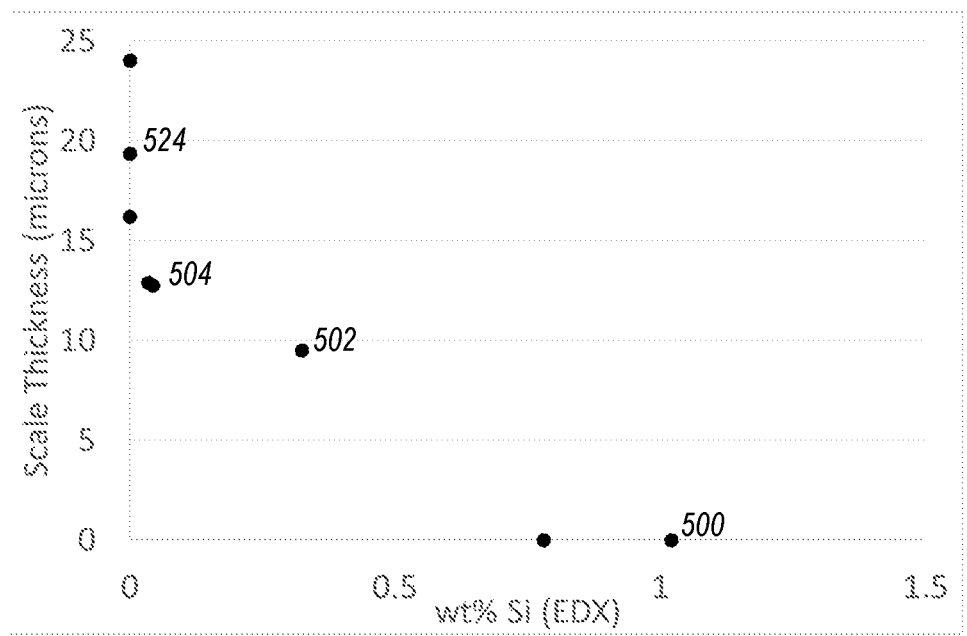
FIG. 5 shows a calibration relationship between deposit layer thicknesses measured by SEM and corresponding concentrations of silicon in the carbon steel substrate measured by SEM-EDX.
Figure 6:
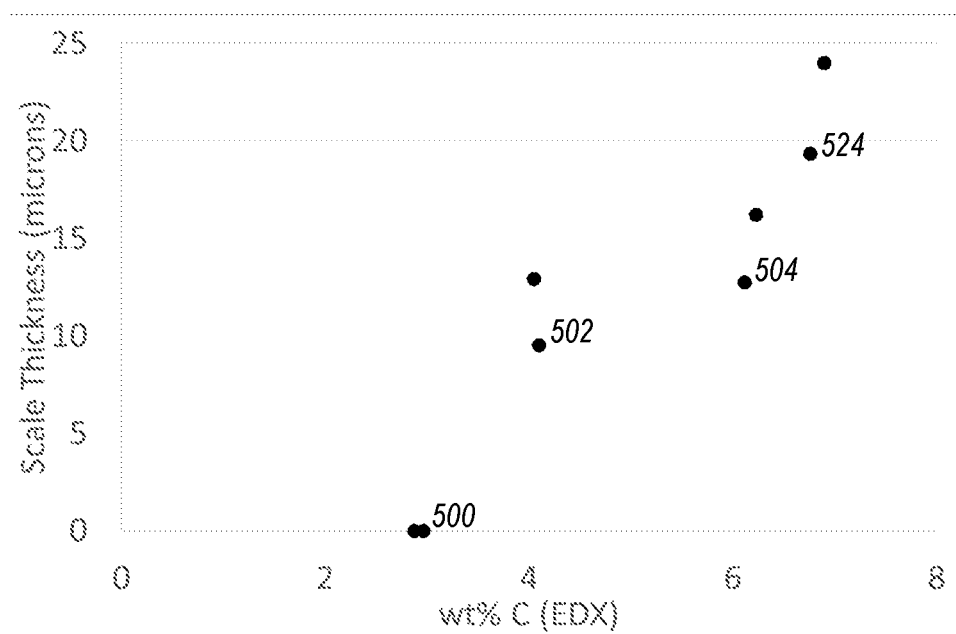
FIG. 6 shows a calibration relationship between deposit layer thicknesses measured by SEM and corresponding concentrations of carbon in the carbon steel substrate measured by SEM-EDX.
Figure 7:
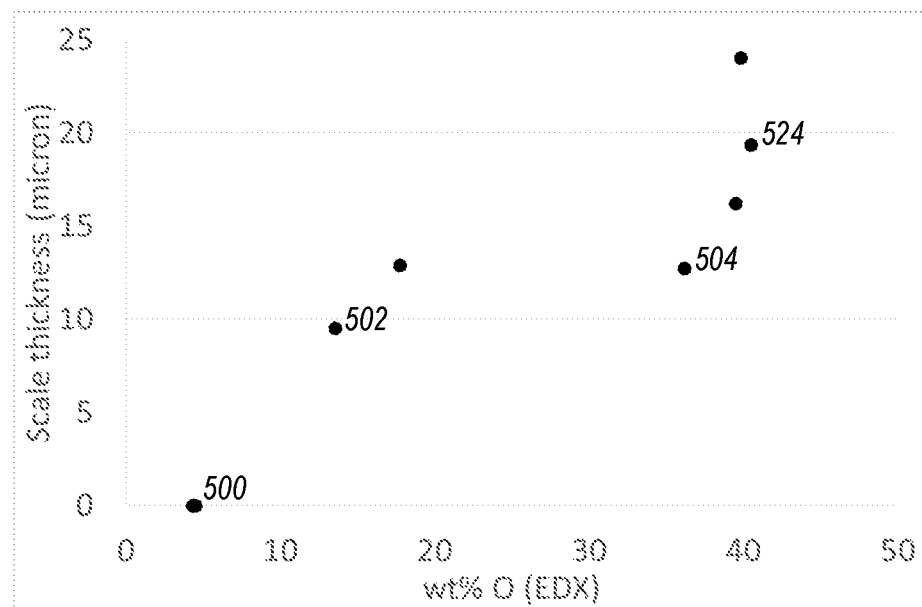
FIG. 7 shows a calibration relationship between deposit layer thicknesses measured by SEM and corresponding concentrations of oxygen in the deposit layer measured by SEM-EDX.
Figure 8:
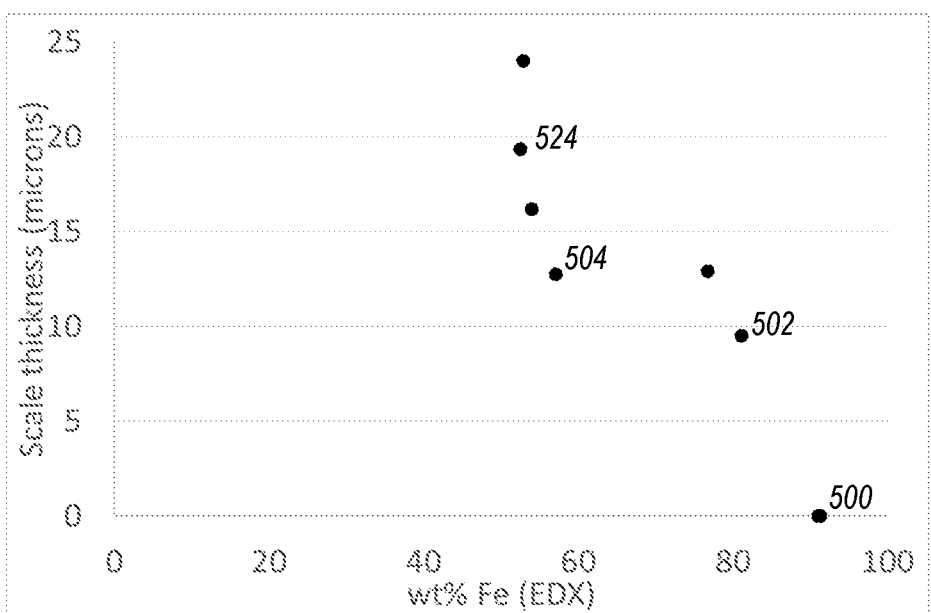
FIG. 8 shows a calibration relationship between deposit layer thicknesses measured by SEM and corresponding concentrations of iron in the deposit layer measured by SEM-EDX.

FIGS. 5, 6, 7, and 8 show how the wt % of Si, C, O, and Fe measured by SEM-EDX respectively vary with deposit thickness measured by SEM in a calibration relationship, with point 500 representing an original sample after GBB, and points 502, 504, and 524 representing samples after 2, 4, and 24 hours, respectively. As shown in FIG. 5, the Si concentrations measured by SEM-EDX are consistent with those measured by XRF and obscuration of Si in the glass bead blasted steel due to scale build up is reflected similarly in SEM-EDX measurements. Carbon and oxygen were detected by SEM-EDX and, accordingly, the trends in FIGS. 6 and 7 show that these two light elements are correlated and the wt % increases as $FeCO_3$ scale thickness increases. Correspondingly, FIG. 8 shows that Fe wt % decreases as scale thickness increases due to increasing C and O appearing in the analyses.

Once a calibration relationship is determined using either XRF or SEM-EDX, it can be relied upon to determine deposit layer thicknesses on future unknown samples or in real-life applications by measuring elemental compositions using non-destructive XRF or SEM-EDX measurements. Destructive SEM methods can therefore be avoided for future measurements once the calibration relationship is established.

Example 2

Sulphidation of Cu—Ni Alloy Substrate Exposed Under Downhole Conditions to $H_2S$ and $CO_2$ at 104° C. for 209 Days Copper nickel alloy (Monel) is a material that may be used in various applications, including as an armor strip housing for power cables connected to an electrical submersible pump (ESP) usable in downhole artificial lift applications. In this example, a 10 cm long armor strip sample of the Monel was exposed for 209 days to conditions at 104° C., with a pressure of 1,674 psig, in a fluid environment at 55 mol % $H_2S$ and 41 mol % $CO_2$.

Prior to the exposure, ten XRF measurements evenly distributed on the 10 cm long armor strip sample were taken and the average of the ten measurements was calculated. The virgin/original Monel sample had an XRF-measured average surface composition of 32.5 wt % Cu, 63.9 wt % Ni, 2.1 wt % Fe, and 1.0 wt % Mn.

After the exposure, another ten XRF measurements evenly distributed on the 10 cm long armor strip sample were taken and the average of the ten measurements was calculated. The XRF-measured average wt % of Cu, Ni, Fe, and Mn on the surface of the armor strips decreased after the exposure, and the average sulfur concentration was 6.2 wt %. Sulfidation results in partial obscuration of the metals in the bulk alloy and a corresponding increase in surface sulfur concentration.

Figure 9:
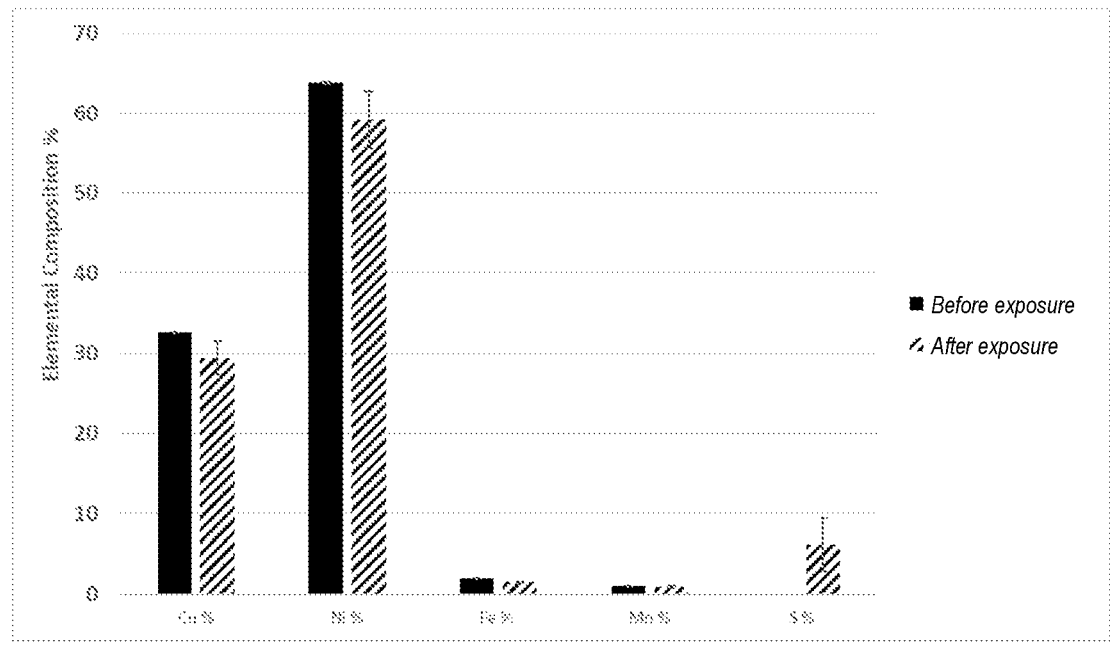
FIG. 9 compares the XRF-determined average elemental compositions of the Monel armor strip surface before and after exposure to the corrosive $H_2S$ environment.

FIG. 9 compares the XRF-determined average elemental compositions of the Monel armor strip surface before and after exposure to the corrosive $H_2S$ environment. As discussed above, these are average results given by ten XRF measurements evenly distributed on the Monel sample. As shown in FIG. 9, the XRF analysis quantifies the decrease in Cu, Ni, Fe, and Mn concentrations and the corresponding increase in sulfur from 0 wt %.

In this Example 2, exposure time was not varied, so the analysis represents a snapshot in terms of the progressive sulphidation process. However, a calibration relationship between scale thicknesses and corresponding elemental compositions based on samples exposed for increasing times could be constructed to allow determination of future unknown scale thicknesses using non-destructive XRF or SEM-EDX methods.

Furthermore, by measuring elemental compositions before and after exposure to the corrosive $H_2S$ environment for a pre-determined period of time, it is possible to determine the rate of growth in the thickness or penetration of the metal sulphide scale.

In general, the rate of deposit layer formation may be calculated as follows, where the deposit layer thicknesses before and after exposure may be determined from elemental composition measurements using a calibration relationship between deposit layer thicknesses and corresponding elemental compositions as shown in Example 1. Alternatively, when exposure time is equal to unit time, no calculation may be needed. An example equation for calculating the rate of deposit formation (K) may include:

$$K = (\text{thickness}_{aft\text{-}exp} - \text{thickness}_{pre\text{-}exp})/t$$

where $\text{thickness}_{aft\text{-}exp}$ is the deposit layer thickness after exposure, $\text{thickness}_{pre\text{-}exp}$ is the deposit layer thickness before exposure, and t is the exposure time. The thicknesses may be expressed in microns and the exposure time in hours, so the rate K may have units of μm/hr.

Alternatively, the rate of deposit layer formation may be calculated by measuring the difference in elemental compositions before and after exposure to the corrosive $H_2S$ environment, and referring to a pre-established calibration relationship between changes in elemental compositions measured by XRF and corresponding rates of deposit layer formation measured by an electrochemical method such as linear polarization resistance. This method is demonstrated in more detail in Example 3.

Figure 10:
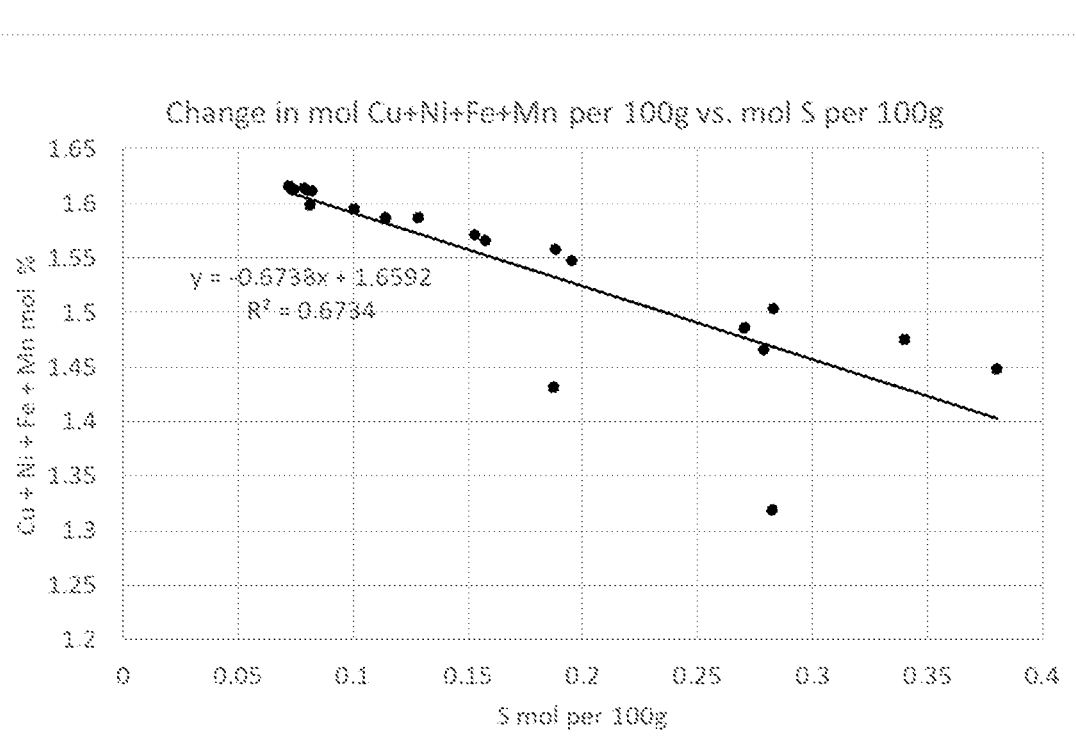
FIG. 10 shows the relationship between the sum of the mol % Cu, Ni, Fe, and Mn and mol % sulfur for ten XRF measurements along a sample surface.

FIG. 10 shows how, for all ten XRF measurements on the exposed Monel armor sample surface, the sum of the mol % of Cu, Ni, Fe, and Mn decreases generally linearly with the increase in mol % of sulfur. Since the exposure time is constant, these results indicate a varying degree of sulphidation of the alloy at different points on the sample surface. Thus, the sulphidation process is somewhat heterogeneous in terms of its degree and/or penetration. Moreover, the data indicates that approximately 0.2 mol (Cu, Ni, Fe, Mn) reacts with approximately 0.3 mol S, suggesting an average metal sulphide composition of $(Cu, Ni, Fe, Mn)S_{1.5}$.

As apparent in FIG. 10, there are two distinct outliers in the mol % (Cu+Ni+Fe+Mn) versus mol % S relationship, namely when the mol % sulfur is about 0.19 and about 0.28. These are accounted for by the presence of an additional metal sulphide, namely lead sulphide, lead (Pb) being detected and quantified by the XRF measurement.

Two specific examples are given above in Examples 1 and 2, namely $FeCO_3$ scale on carbon steel substrate and metal sulphide scale on CuNi alloy, respectively. However, it is understood that the method can be used to monitor the growth of various types of scale on numerous metal/alloy substrates, provided that there is a differentiating XRF-detectable element in the scale and/or the substrate. The XRF instrument may not quantify some lighter elements such as carbon and oxygen but, in contrast, SEM-EDX will report weight percentages of these light elements. As a result, when the differentiating element in the scale and/or the substrate involves a lighter element that's not readily detectable by XRF, SEM-EDX may be used instead of or to supplement XRF.

Example 3

Development of corrosion products on carbon steel substrate exposed to $CO_2$-saturated brine at 70° C. without corrosion inhibitors A low carbon AISI SAE 1018 steel with a manufacturer's composition specification of 0.14-0.20 wt % carbon, 98.81-99.26 wt % iron, 0.60-0.90 wt % manganese, ≤0.040 wt % phosphorous, and ≤0.050 wt % sulfur, was the substrate material.

After the carbon steel samples were polished with P1200 silicon carbide paper and before being exposed to a corrosive environment, XRF analyses of the bulk C-steel gave the following elemental composition (wt %) for three different samples:

TABLE 3

|  | Fe | Mn | Cu | Cr | Ni | Mo | Sn | P | Si |
| --- | --- | --- | --- | --- | --- | --- | --- | --- | --- |
| Sample 1 | 97.55 | 0.806 | 0.148 | 0.094 | 0.107 | 0.026 | 0.017 | — | 0.482 |
| Sample 2 | 97.34 | 0.792 | 0.156 | 0.097 | 0.104 | 0.025 | 0.017 | 0.024 | 0.676 |
| Sample 3 | 98.04 | 0.748 | 0.06 | 0.04 | — | 0.008 | — | — | 0.356 |

Samples were then exposed to $CO_2$-saturated 3% NaCl brine at 70° C. for 2, 5, 7, and 24 hours respectively. During this period, linear polarization resistance (LPR) measurements were taken each hour. Each LPR measurement was used to determine an instantaneous corrosion rate represented by the parameter 1/Rp. From this data, cumulative 1/Rp can be calculated, which is proportional to cumulative weight loss for any given exposure time, and thus proportional to cumulative corrosion rate over any given exposure time.

After exposure, samples were rinsed with water and dried. XRF analyses were carried out on the steel surface before and after exposure and the compositional changes investigated.

Figure 11:
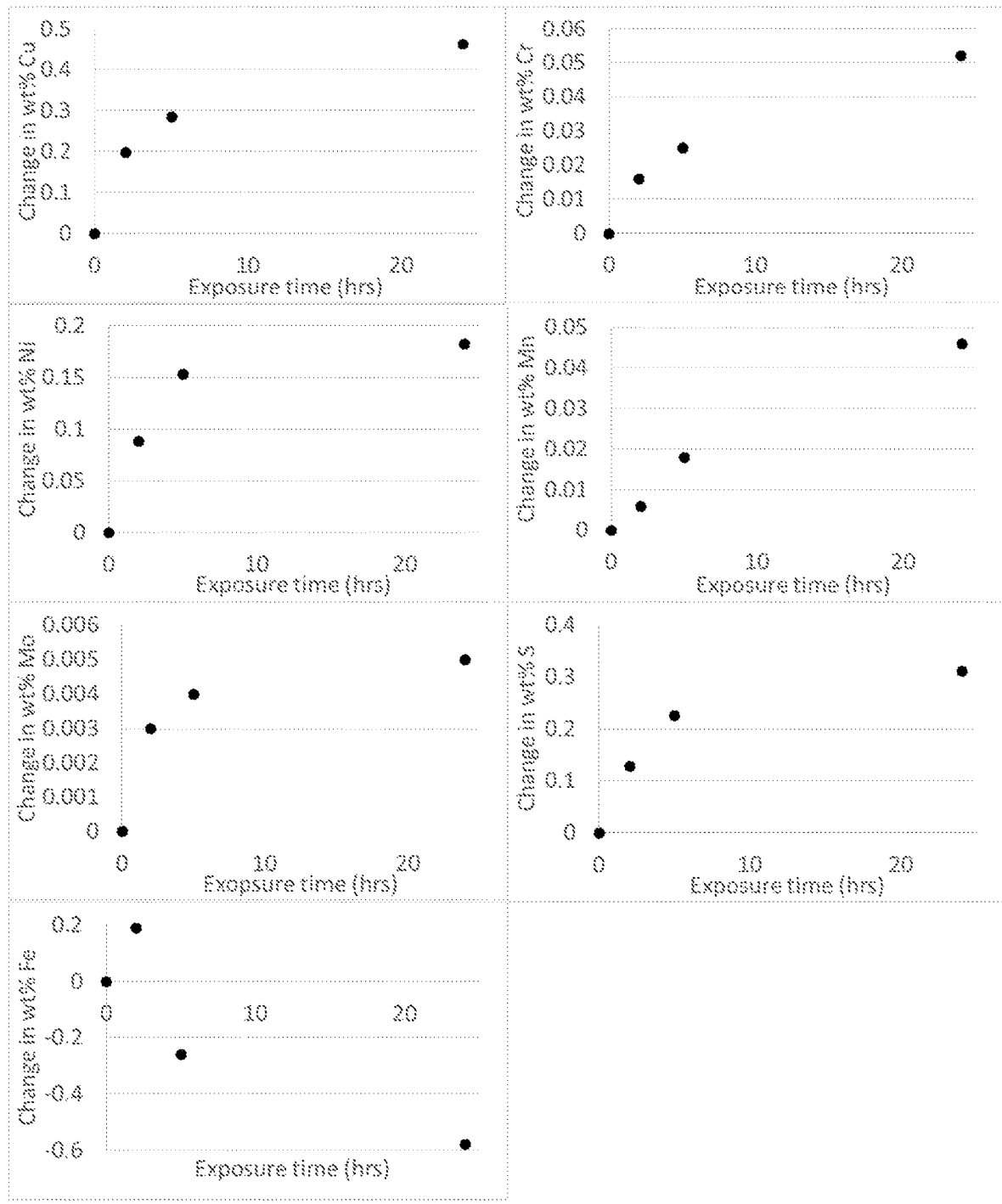
FIG. 11 shows, for each element, the change in wt % detected by XRF as a function of exposure time.

FIG. 11 shows the change in wt % of each element detected by XRF respectively as a function of the exposure time. Analyses reveal a surface enhancement of minor elements, Cu, Cr, Ni, Mn, Mo, and S following exposure due to preferential corrosion of the ferrite phase of the steel and oxides of the minor elements forming on the surface. The change in surface Fe concentration varies for each sample, but a general decrease is expected and observed, which reflects the enhancement of the minor elements.

A calibration relationship may be established if deposit layer thicknesses are measured directly (e.g., using SEM) and correlated with corresponding elemental compositions measured by XRF.

As explained herein, the rate of deposit layer formation can be calculated by measuring elemental compositions before and after exposure to a corrosive and/or scaling environment for a pre-determined period of time. In corrosion cases, the rate of deposit layer formation can be expressed as corrosion rate.

In this Example 3, corrosion rate was measured by Linear Polarization Resistance (LPR), which is an electrochemical technique that allows corrosion rates to be measured directly in real-time. Each LPR measurement was used to determine an instantaneous corrosion rate represented by the parameter $1/R_p$. From these data, cumulative $1/R_p$ can be calculated, which is proportional to cumulative corrosion rate over any given exposure time.

Figure 12:
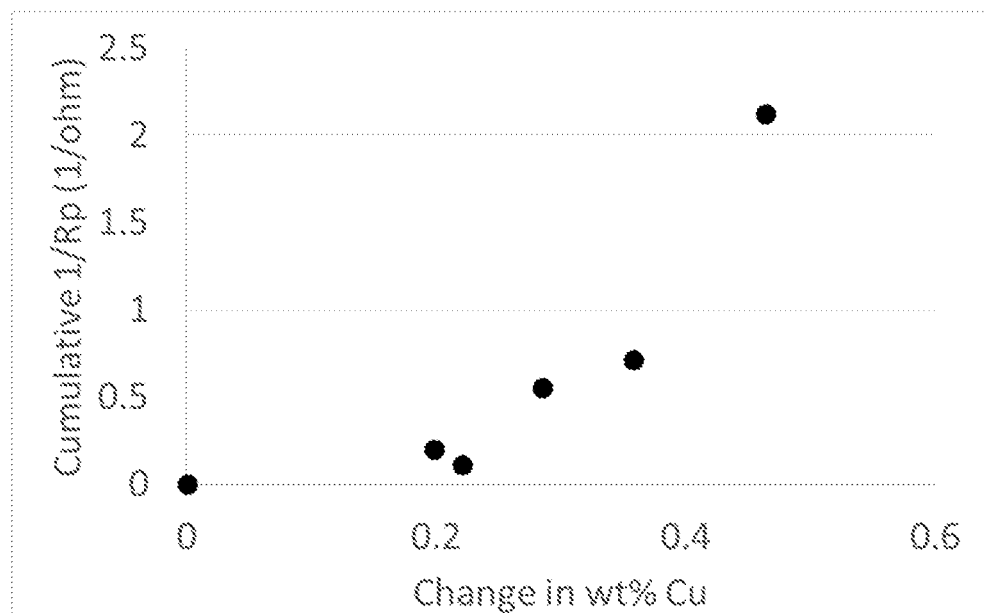
FIG. 12 shows a calibration relationship between the changes in the concentration of copper in the carbon steel substrate detected by XRF and corresponding cumulative corrosion rates of the substrate in brine.

FIG. 12 shows how the change in elemental composition, in particular Cu, detected by XRF over a certain period is correlated with cumulative corrosion rate of the steel during the same period. The relationship shown in FIG. 12 can be used as a calibration relationship to determine future unknown corrosion rates from changes in elemental compositions measured using non-destructive XRF methods.

Conveniently, unit time may be used in establishing the calibration relationship, so that each change in element composition is measured over the length of unit time. Future unknown corrosion rates over unit time can then be read off the calibration curve, once the change in elemental composition over the same unit time is determined by XRF.

Otherwise, in establishing the calibration relationship, the percentage change in elemental composition may be divided by the length of time during which the change happened to obtain change in elemental composition per unit time. Future unknown corrosion rate over unit time may then be obtained from the XRF-measured change in elemental composition per unit time using a calibration relationship such as the one shown in FIG. 12. If a single change in elemental composition over a different length of time is obtained, change in elemental composition per unit time can be calculated first before referring to the calibration relationship.

Example 4

Development of Corrosion Products on Carbon Steel Substrate Exposed to $CO_2$-Saturated Brine at 70° C. with Corrosion Inhibitors In Example 4, the general conditions of Example 3 were repeated, but this time in the presence of corrosion inhibitors. In particular, the carbon steel samples were polished with P1200 silicon carbide paper prior to initial XRF analysis. The 1018 steel samples were then exposed to $CO_2$-saturated 3% NaCl brine at 70° C. for 2 hours in a pre-corrosion step, before addition of 50 ppm inhibitor before a further 24 hours of exposure. A range of inhibitors in the general class of alkyl amino-ethyl or hydroxy-ethyl imidazolines were studied. The alkyl amino-ethyl or hydroxy-ethyl imidazoline corrosion inhibitors studied have varying alkyl chain length and differing inhibition efficiencies. After exposure, samples were rinsed with water and dried. XRF analyses were carried out on the steel surface before and after testing and the compositional changes investigated.

Figures 1, 13:
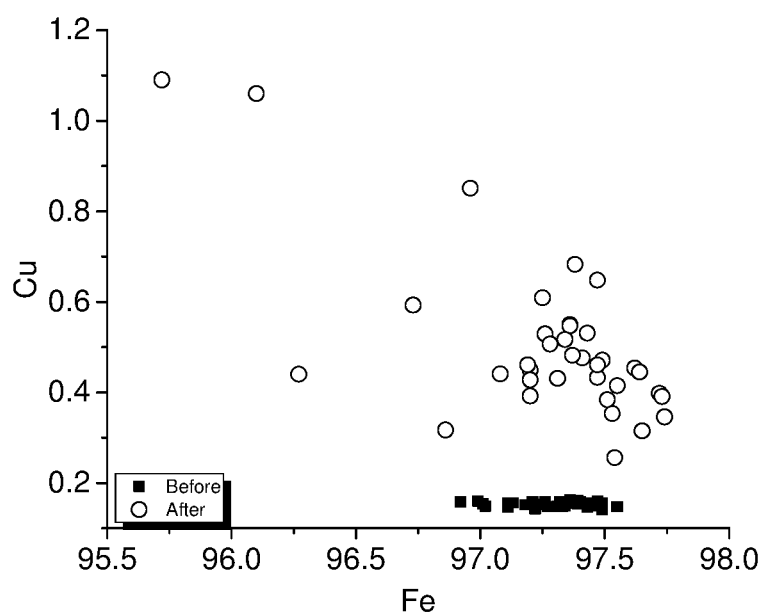
Figures 2, 13:
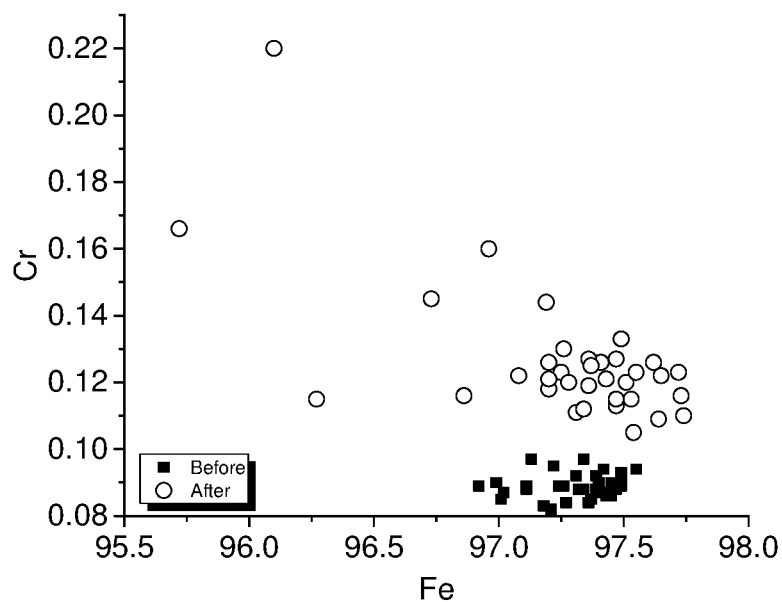
Figures 3, 13:
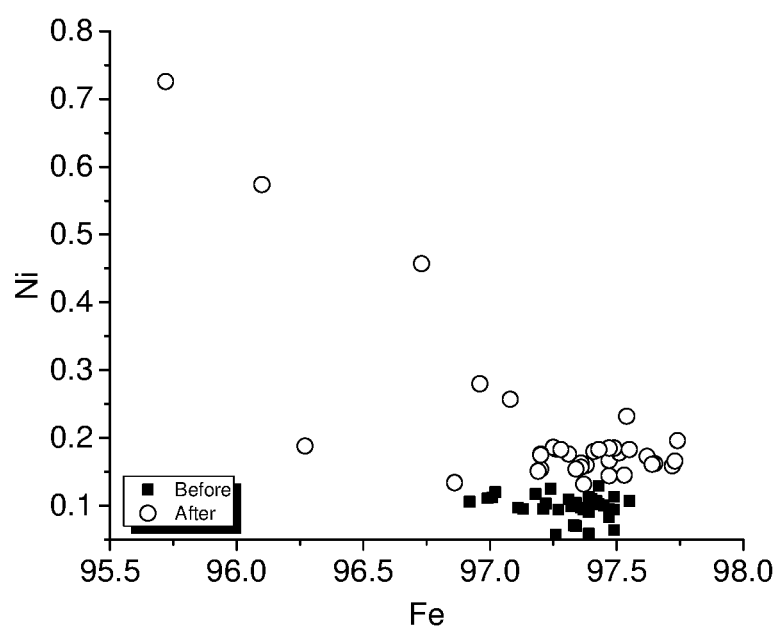
Figures 4, 13:
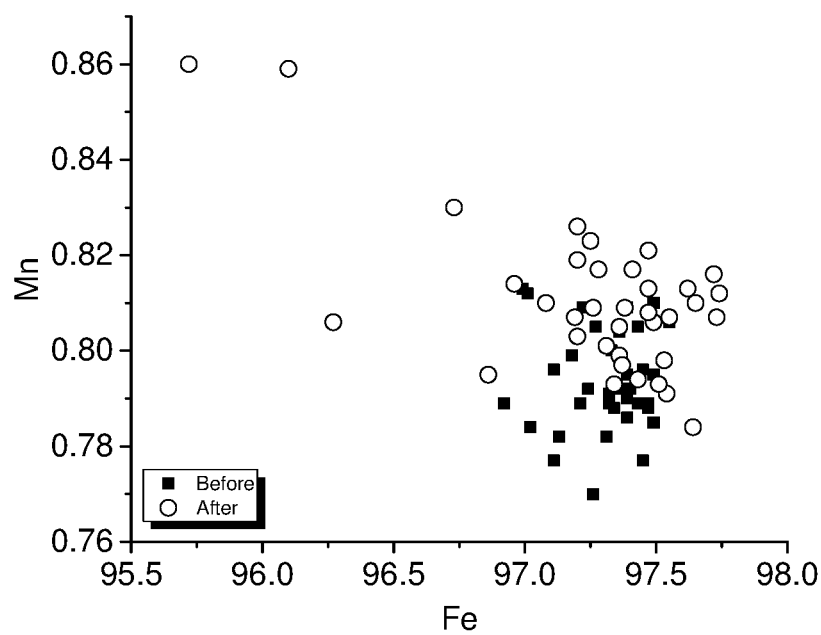
Figures 5, 13:
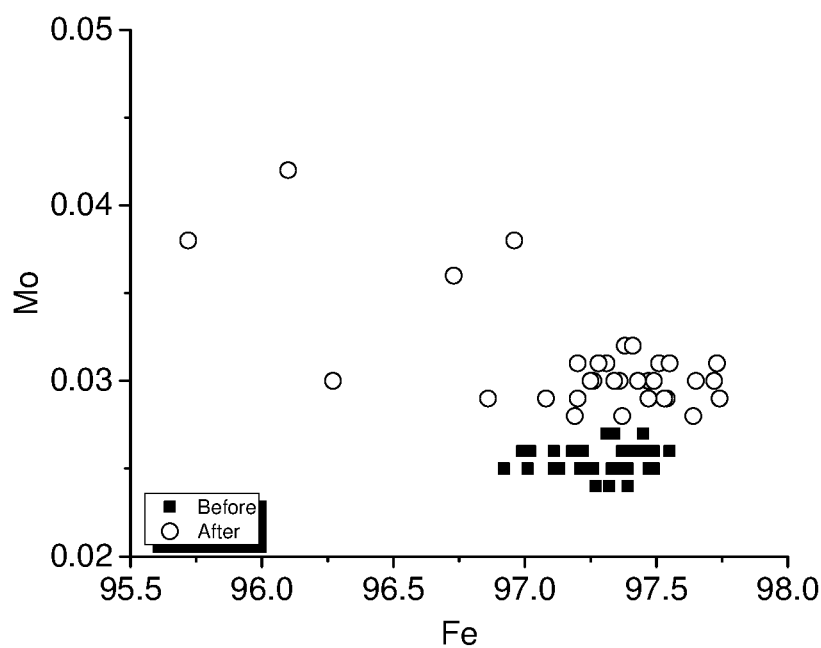

FIG. 13 (including FIGS. 13-1, 13-2, 13-3, 13-4, and 13-5) shows again that XRF analyses (wt %) reveal a surface enhancement of minor elements following testing, including, Cu, Cr, Ni, Mo, and Mn. This can again be due to preferential corrosion of the ferrite phase of the steel and oxides of the minor elements forming on the surface.

As discussed above, concentrations of an element X enhanced in the deposit layer (e.g., Cu, Cr, Ni, Mn, and Mo), may be correlated with corresponding deposit layer thicknesses independently measured by SEM to produce a calibration relationship. The calibration relationship can then be used to determine unknown deposit layer thicknesses using future XRF measurements. XRF ratios between concentrations of element X enhanced in the deposit layer and corresponding concentrations of Y enhanced in substrate and obscured by the deposit layer (e.g., Fe) can be calculated and plotted against corresponding deposit layer thicknesses independently measured by SEM to produce a more sensitive calibration relationship, which takes into account the changes in the concentrations of X and Y simultaneously in a single calibration relationship.

Similarly, concentrations of X enhanced in the deposit layer (or XRF ratios between concentrations of X enhanced in the deposit layer and corresponding concentrations of Y enhanced in substrate and obscured by the deposit layer) can be plotted against corresponding rates of deposit layer formation independently measured by LPR to produce a calibration relationship, which can be used to determine unknown deposit layer formation rates using future XRF measurements.

Figures 1, 14:
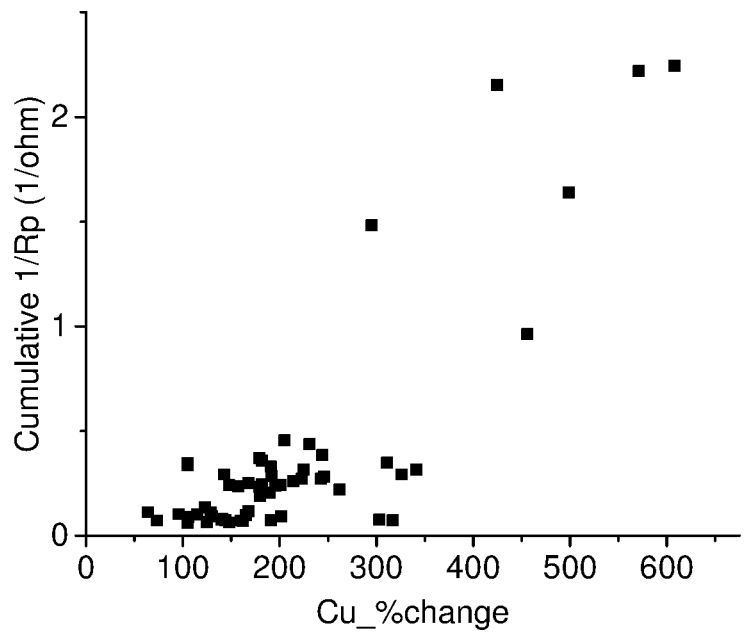
Figures 2, 14:
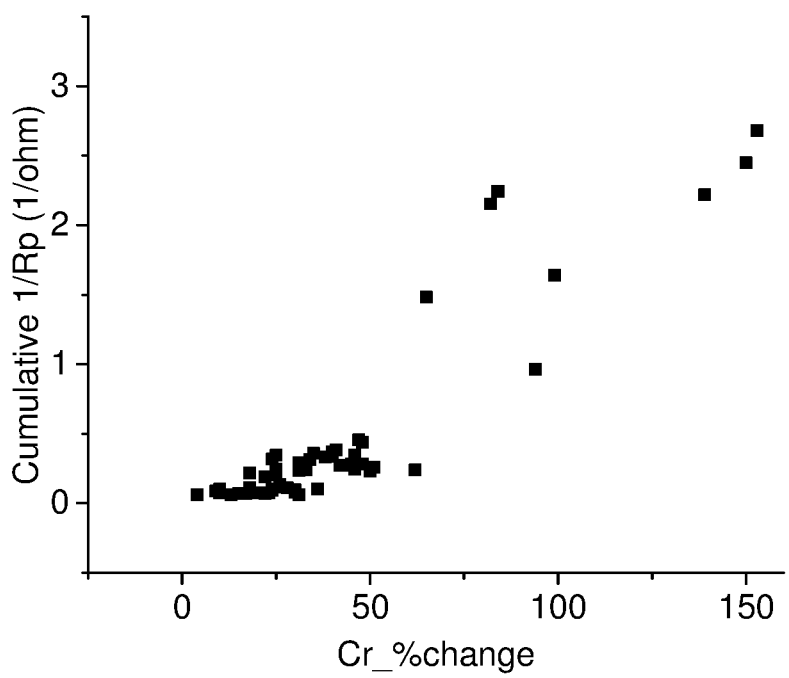
Figures 3, 14:
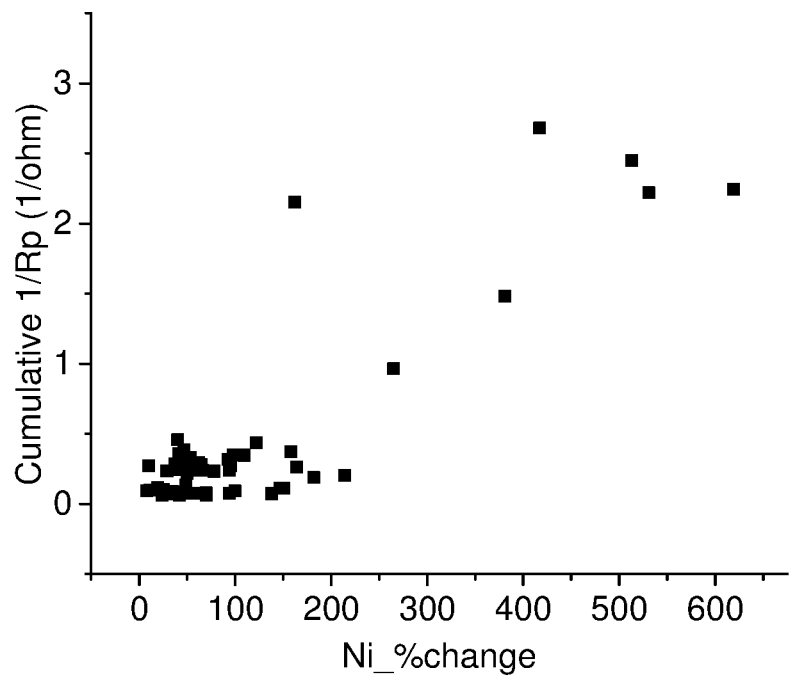

To demonstrate, FIG. 14 (including FIGS. 14-1, 14-2, and 14-3) relate the XRF measured concentrations of Cu, Cr, and Ni with corresponding cumulative corrosion rates over the same period, which are independently measured by LPR. Using calibration relationships such as those shown in FIG. 14 would allow XRF to be used as a method to determine future unknown corrosion rates.

Further, by determining and comparing deposit layer thicknesses and/or corrosion rates before and after a treatment with a corrosion inhibitor or with and without the presence of a corrosion inhibitor, the effectiveness of the corrosion inhibitor can be evaluated. Relative effectiveness of different corrosion inhibitors can be evaluated by repeating the same test with different corrosion inhibitors over the same period time under same conditions.

For example, if change in wt % Cu is plotted against cumulative $1/R_p$ for any given corrosion inhibitor tested in this Example 4, the plot can be compared with FIG. 11 from Example 3 to determine the effectiveness of the relevant corrosion inhibitor. Plots for different corrosion inhibitors can also be compared with each other to determine their relative effectiveness.

Example 5

Growth of $FeCO_3$ Scale on Carbon Steel Substrate Exposed to $CO_2$-Saturated Brine at 150° C. with Corrosion Inhibitors In Example 5, GBB 1018 steel samples like those used in Example 1 were tested in the presence of a TOFA (Tall Oil Fatty Acid) based amino-ethyl imidazoline corrosion inhibitor.

In particular, the GBB samples were exposed to $CO_2$-saturated 3% NaCl brine at 150° C. for 2, 4, 6, 12, 24, 36, and 48 hours in the presence of 200 ppm of the TOFA-based amino-ethyl imidazoline corrosion inhibitor. The concentration of corrosion inhibitor used was such that appreciable scale was prevented from forming, but corrosion products did form on the surface. After exposure, samples were rinsed with water and dried. XRF analysis were carried out on the steel surfaces before and after testing and the compositional changes investigated.

Figures 1, 15:
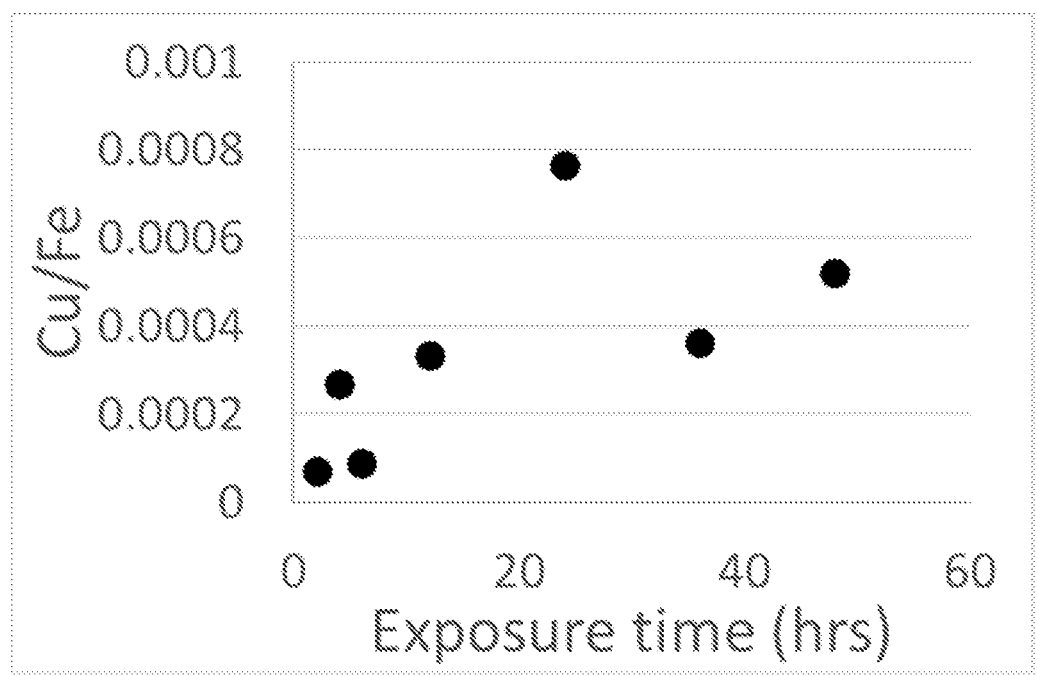
Figures 2, 15:
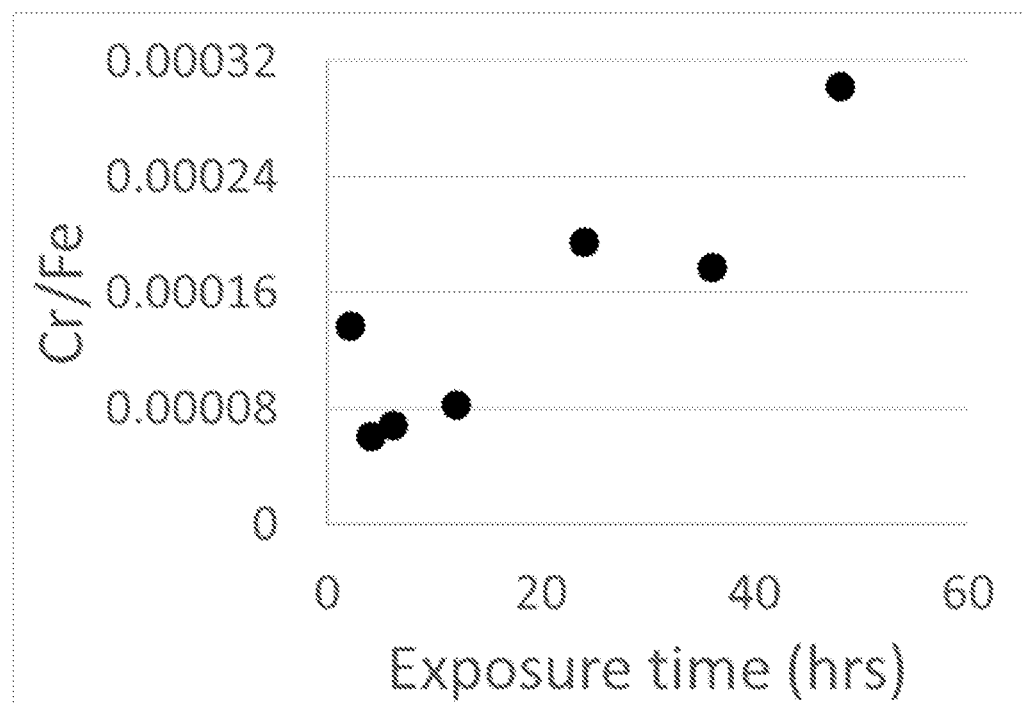
Figures 3, 15:
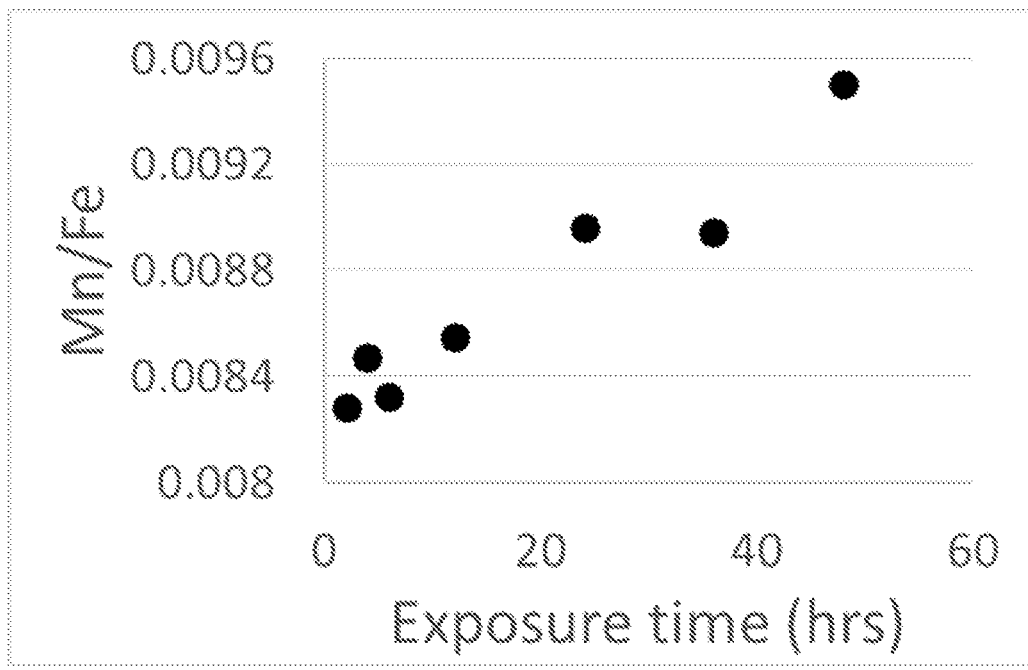

FIG. 15 (including FIGS. 15-1, 15-2, and 15-3) show that XRF analysis reveals a surface enhancement of minor elements, Cu, Cr, and Mn following exposure, which is again likely due to preferential corrosion of the ferrite phase of the steel, while oxides of the minor elements form on the surface. As with the previous set of samples, relating this data with independently measured corresponding corrosion rates, such as cumulative corrosion rates, to establish a calibration relationship, would allow XRF to be used as a method to measure corrosion rates, such as cumulative corrosion rates.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations. Further, the various examples are presented by way of illustration; however, features and aspects of different examples may be combined except where such aspects are mutually exclusive.

While the principles of the disclosure have been described above in connection with specific apparatuses and methods, it is to be clearly understood that this description is made only by way of example and not as limitation on the scope of the invention.

Specific details are given in the description to provide an understanding of the embodiments. However, it will be understood by one of ordinary skill in the art that the described embodiments may be practiced without these specific details. Additionally, in order to unnecessarily complicate the disclosure, aspects of well-known circuits, processes, processes, structures, and techniques are described without unnecessary detail in order to avoid obscuring the embodiments, as such aspects are understood by those of skill in the art. For instance, some XRF spectrum interpretation algorithms, processes, and equipment are not defined in exhaustive detail as they are already understood by the person of ordinary skill in the art.

Further, embodiments may be implemented by hardware, software, firmware, middleware, microcode, hardware description languages, other mechanisms, or any combination thereof. When implemented in software, firmware, middleware or microcode, the program code or code segments to perform the necessary tasks may be stored in a machine-readable medium such as storage medium, or transmitted in a machine-readable medium such as transmission media. A processor(s) may perform the tasks within a routine or method. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, "storage media", "computer-readable storage media," and the like refer to physical media that stores software instructions in the form of computer-readable program code that allows performance of embodiments of the present disclosure. "Transmission media", "computer-readable transmission media," and the like refer to non-physical media which carry software instructions in the form of computer-readable program code that allows performance of embodiments of the present disclosure. Thus, by way of example, and not limitation, embodiments of the present disclosure can include at least two distinctly different kinds of computer-readable media, namely storage media and/or transmission media. Combinations of storage media and transmission media are included within the scope of computer-readable media.

To further illustrate the distinct nature of storage media and transmission media, storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or solid state drives, or other types of storage devices.

Transmission media may conversely include communications networks or other data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can therefore include a communication network and/or data links, carrier waves, wireless signals, and the like, which can be used to carry desired program, code means, or instructions.

Computer-readable media may therefore be within computer system in some embodiments, but may be distributed within and/or across multiple internal and/or external enclosures of a computing system, multiple computing systems, or a computing network. Computer-readable media of such type may be implemented as one or more computer-readable or machine-readable storage media, transmission media, or a combination of storage and transmission media.

Instructions may be provided on one computer-readable or machine-readable medium, or may be provided on multiple computer-readable or machine-readable media distributed in a large system having possibly plural nodes. Such computer-readable or machine-readable medium or media is (are) considered to be part of an article (or article of manufacture). An article or article of manufacture may refer to any manufactured single component or multiple components. The computer-readable medium or media may be located either in the machine running the machine-readable instructions, or located at a remote site from which machine-readable instructions may be downloaded over a network for execution. Further, where transmission media is used, upon reaching various computing system components, program code in the form of computer-executable instructions or data structures can be transferred automatically or manually from transmission media to storage media (or vice versa). For example, computer-executable instructions or data structures received over a network or data link can be buffered in memory-type storage media (e.g., RAM) within a network interface module (NIC), and then eventually transferred to computer system RAM and/or to less volatile storage media (e.g., a hard drive or optical storage) at a computer system. Thus, it should be understood that storage media can be included in computer system components that also (or even primarily) utilize transmission media.

It is to be understood that the disclosure herein provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, but may also include embodiments in which additional features may be formed or provide between the first and second features, such that the first and second features may not be in direct contact.

Embodiments of the present disclosure may be described as a process that may include various acts, or which can be depicted as a flowchart, a flow diagram, a data flow diagram, a structure diagram, or a block diagram. Although a process or flowchart may describe the operations as a sequential process, many of the operations can be performed at least partially in parallel or concurrently. In addition, the order of the operations may be re-arranged. A process may terminate or restart when its operations are completed, but could have additional steps not included in the description or figure, or some or all of the steps may be repeated through an iterative process. A process may correspond to a method, a function, a procedure, a subroutine, a subprogram, etc. When a process or act corresponds to a function, its termination can correspond to a return of the function to the calling function or a main function.

As used herein, the terms "having", "including", "comprising", and the like are intended to be open-ended, whereas the term "consisting" is closed. Thus, a method having/including/comprising three elements may include more than the three elements, whereas a method consisting of the three elements would include only the recited three elements. The term "or" as used herein is not intended to be mutually exclusive of recited options, unless the context clearly indicates otherwise. Thus, a method including A or B would include A alone, B alone, or A and B. In contrast, a method including a single one of A or B would include A lone or B alone, but not A and B.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions and alterations herein without departing from the scope of the present disclosure.

What is claimed is:

1. A method for measuring a thickness of a deposit layer on a metal or alloy substrate using an X-ray fluorescence (XRF) spectrometer, wherein the deposit layer includes scale deposits, corrosion products, or both, the method comprising:
    measuring an elemental composition of at least one of the deposit layer, the metal substrate, or the alloy substrate using the XRF spectrometer; and
    obtaining the thickness of the deposit layer from the elemental composition using a calibration relationship between deposit layer thicknesses and corresponding elemental compositions of the at least one of the deposit layer, the metal substrate, or the alloy substrate, wherein the calibration relationship is a relationship between deposit layer thicknesses measured by scanning electron microscopy (SEM) and corresponding elemental compositions of the at least one of the deposit layer, the metal substrate, or the alloy substrate measured by the XRF spectrometer.

2. The method of claim 1, wherein the elemental composition is a concentration of an element in the at least one of the deposit layer, the metal substrate, or the alloy substrate, and the calibration relationship is a relationship between the deposit layer thicknesses and corresponding concentrations of the element in the at least one of the deposit layer, the metal substrate, or the alloy substrate.

3. The method of claim 1, wherein the elemental composition is a ratio between a concentration of an element in the deposit layer and a concentration of an element in the metal substrate or the alloy substrate, and the calibration relationship is a relationship between the deposit layer thicknesses and corresponding ratios between the concentration of the element in the deposit layer and the concentration of the element in the metal substrate or the alloy substrate.

4. The method of claim 1, wherein the XRF spectrometer comprises an energy-dispersive XRF (EDX) spectrometer.

5. The method of claim 1, wherein the deposit layer comprises at least one of calcite ($CaCO_3$), barite ($BaSO_4$), celestite ($SrSO_4$), anhydrite ($CaSO_4$), gypsum ($CaSO_4 \cdot 2H_2O$), iron sulphide (FeS), halite (NaCl), aragonite ($CaCO_3$), vaterite ($CaCO_3$), siderite ($FeCO_3$), fluorite ($CaF_2$), sphalerite (ZnS), galena (PbS), silicate scales, oxides, hydroxides, or carbides.

6. The method of claim 1, wherein the metal substrate or the alloy substrate is part of a tool or equipment for at least one of oilfield operations, treatments, or measurements.

7. The method of claim 6, further comprising:
    comparing the thickness of the deposit layer with a predetermined threshold; and
    deciding when to deploy, repair, or replace the tool or the equipment.

8. The method of claim 1, further comprising:
    comparing the thickness of the deposit layer with a predetermined threshold; and
    deciding when to perform a treatment to reduce at least one of scale or corrosion.

9. The method of claim 1, further comprising:
comparing the thickness of the deposit layer with a predetermined threshold; and
triggering automatic performance of a treatment based on the comparison of the thickness of the deposit layer to the predetermined threshold.

10. The method of claim 9, wherein the treatment includes adding one or more of scale inhibitors or corrosion inhibitors, performing a cleaning procedure, or performing a scale removal procedure.

11. A method for measuring a rate of deposit layer formation on a metal or alloy substrate using an X-ray fluorescence (XRF) spectrometer, wherein the deposit layer includes scale deposits or corrosion products, the method comprising:
obtaining a first elemental composition of the deposit layer or the metal or alloy substrate;
exposing the metal or alloy substrate to a scaling or corrosive environment for a first period;
measuring a second elemental composition of the deposit layer or metal or alloy substrate using the XRF spectrometer after the first period;
obtaining a first change in elemental composition by calculating a difference between the first and second elemental composition of the deposit layer or the metal or alloy substrate; and
determining a first rate of deposit layer formation on the metal or alloy substrate during the first period using a calibration relationship between rates of deposit layer formation and corresponding changes in elemental composition.

12. The method of claim 11, wherein the rate of deposit layer formation is expressed as a rate of corrosion or rate of scaling.

13. The method of claim 12, wherein the rate of corrosion or the rate of scaling is a first rate of corrosion or first rate of scaling, the method further comprising:
performing a treatment to reduce scale deposits or corrosion products on the metal or alloy substrate;
obtaining the second elemental composition of the deposit layer or the metal or alloy substrate;
exposing the metal or alloy substrate to a scaling or corrosive environment for a second period;
measuring a third elemental composition of the deposit layer or the metal or alloy substrate using the XRF spectrometer after the second period;
obtaining a second change in elemental composition by calculating a difference between the second and third elemental composition of the deposit layer or the metal or alloy substrate;
determining a second rate of deposit layer formation on the metal or alloy substrate during the second period using the calibration relationship, wherein the second rate of deposit layer formation is expressed as a second rate of corrosion or a second rate of scaling;
comparing the first rate of corrosion or scaling with the second rate of corrosion or scaling; and
evaluating an effectiveness of the treatment to reduce the scale deposits or the corrosion products.

14. The method of claim 13, wherein the treatment includes adding scale inhibitors or corrosion inhibitors to the scaling or corrosive environment, performing a cleaning procedure, or performing a removal procedure.

15. The method of claim 11, wherein the calibration relationship is between rates of deposit layer formation measured using an electrochemical method and corresponding changes in elemental composition measured using the XRF spectrometer.

16. The method of claim 12, further comprising:
exposing the metal or alloy substrate to the scaling or corrosive environment for a second period;
measuring a third elemental composition of the deposit layer or the metal or alloy substrate using the XRF spectrometer after the second period;
obtaining a second change in elemental composition by calculating a difference between the second and third elemental composition of the deposit layer or the metal or alloy substrate;
determining a second rate of deposit layer formation on the metal or alloy substrate during the second period using the calibration relationship; and
predicting a future rate of scaling or future rate of corrosion.

17. The method of claim 15, wherein the removal procedure includes scale dissolution, scale erosion, or scale blasting.

18. The method of claim 11, wherein the scaling or corrosive environment is a downhole environment.

19. A method for measuring a thickness of a deposit layer on a metal or alloy substrate using an X-ray fluorescence (XRF) spectrometer, wherein the deposit layer includes scale deposits, corrosion products, or both, the method comprising:
measuring an elemental composition of at least one of the deposit layer, the metal substrate, or the alloy substrate using the XRF spectrometer, wherein the elemental composition is a ratio between a concentration of an element in the deposit layer and a concentration of an element in the metal substrate or the alloy substrate, and a calibration relationship is a relationship between deposit layer thicknesses and corresponding ratios between the concentration of the element in the deposit layer and the concentration of the element in the metal substrate or the alloy substrate; and
obtaining the thickness of the deposit layer from the elemental composition using a calibration relationship between deposit layer thicknesses and corresponding elemental compositions of the at least one of the deposit layer, the metal substrate, or the alloy substrate.

20. The method of claim 19, wherein the metal substrate or the alloy substrate is part of a tool or equipment for at least one of oilfield operations, treatments, or measurements.

* * * * *